(12) United States Patent
Yoda

(10) Patent No.: US 7,194,635 B1
(45) Date of Patent: Mar. 20, 2007

(54) METHOD FOR SECURE DELIVERY OF DIGITAL IMAGE DATA USING AN EMBEDDED WATERMARK BASED ON A RECEIVING INDENTITY

(75) Inventor: Akira Yoda, Kanagawa-ken (JP)

(73) Assignee: Fuji Photo Film Co., Ltd, Kanagawa (JP)

( * ) Notice: Subject to any disclaimer, the term of this patent is extended or adjusted under 35 U.S.C. 154(b) by 0 days.

(21) Appl. No.: 09/363,892

(22) Filed: Jul. 30, 1999

(30) Foreign Application Priority Data

Jul. 30, 1998 (JP) ............................... 10-214986
Jul. 23, 1999 (JP) ............................... 11-209223

(51) Int. Cl.
*G06F 12/14* (2006.01)

(52) U.S. Cl. .................. 713/193; 713/189; 713/190

(58) Field of Classification Search ............... 713/176, 713/193, 189, 190; 382/100; 380/201–203; 705/57–58
See application file for complete search history.

(56) References Cited

U.S. PATENT DOCUMENTS

| | | | |
|---|---|---|---|
| 4,775,978 A * | 10/1988 | Hartness | 714/770 |
| 5,636,276 A * | 6/1997 | Brugger | 705/54 |
| 5,841,886 A * | 11/1998 | Rhoads | 382/115 |
| 5,850,481 A * | 12/1998 | Rhoads | 382/232 |
| 5,930,369 A | 7/1999 | Cox et al. | |
| 6,185,682 B1 * | 2/2001 | Tang | 713/168 |
| 6,205,249 B1 * | 3/2001 | Moskowitz | 382/232 |
| 6,438,251 B1 * | 8/2002 | Yamaguchi | 382/100 |
| 6,707,927 B1 * | 3/2004 | Kita et al. | 382/100 |

FOREIGN PATENT DOCUMENTS

| | | | | |
|---|---|---|---|---|
| JP | 09191394 A | * | 7/1997 | 713/176 |
| JP | 10-191025 | | 7/1998 | |

* cited by examiner

*Primary Examiner*—Lee Thomas
*Assistant Examiner*—Malcolm Cribbs
(74) *Attorney, Agent, or Firm*—Birch, Stewart, Kolasch & Birch, LLP

(57) ABSTRACT

It is made possible to specify a person receiving data in delivering data such as image data. Also, to render it possible to reliably verify a range of received data, specific information is embedded changing an embedding position for each receiver receiving data delivery when data 120, such as image data, voice data and the like, is delivered via a public line network 120. At a receiver side, the above-mentioned specific information is read out by employing information reading means 114 that the embedding position is made known to, and the read information is encrypted and output along with information to specify a receiver.

28 Claims, 17 Drawing Sheets

FIG.3
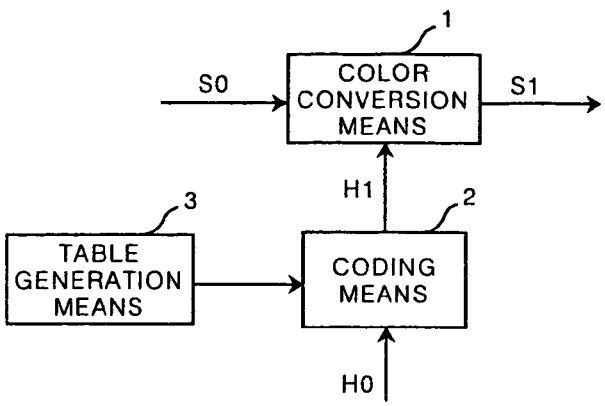
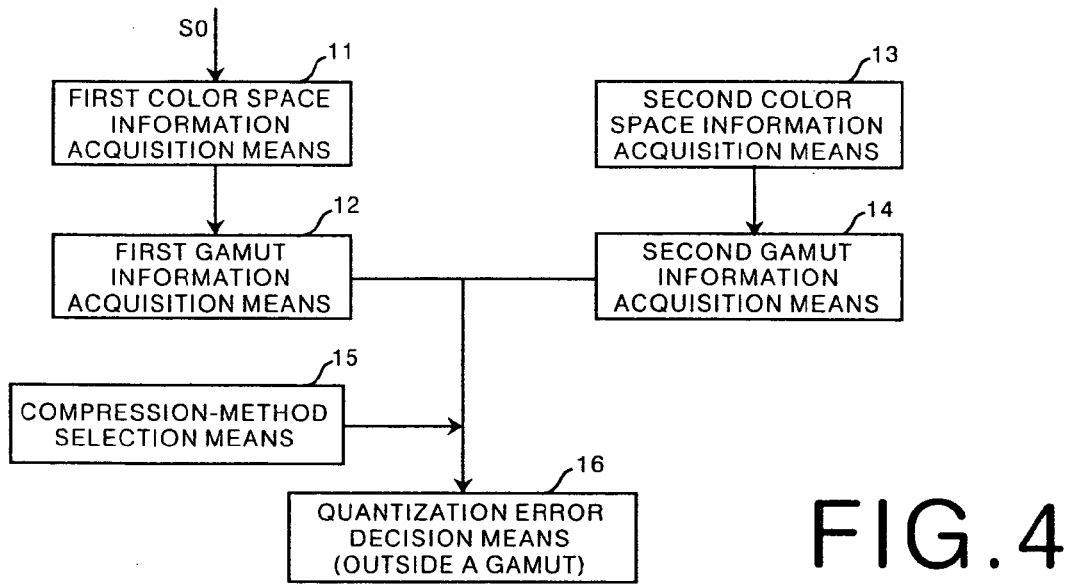
FIG.4
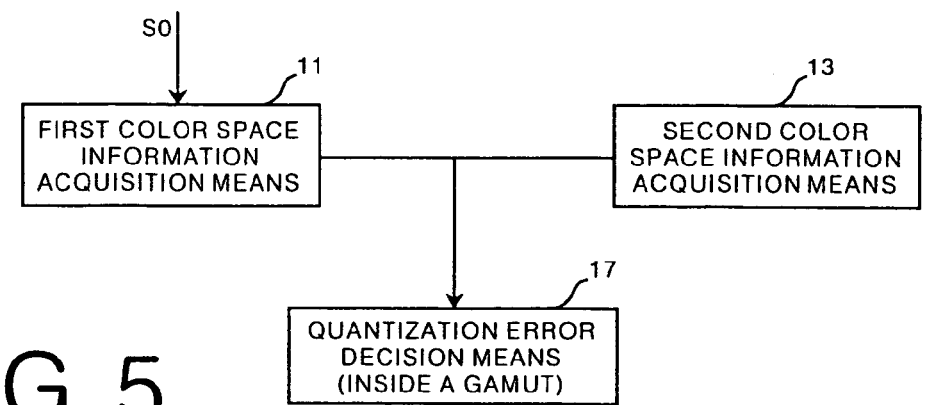
FIG.5

FIRST COLOR SPACE        SECOND COLOR SPACE

FIRST COLOR SPACE        SECOND COLOR SPACE (a)

(b)

(c)

METHOD FOR SECURE DELIVERY OF DIGITAL IMAGE DATA USING AN EMBEDDED WATERMARK BASED ON A RECEIVING INDENTITY

BACKGROUND OF THE INVENTION

1. Field of the Invention

The present invention relates to a method of delivering data such as image data, and more particularly to a data delivery method that is capable of specifying a data receiver and verifying a range of received data.

The present invention also relates to a storage medium having stored software for executing a data delivery method such as the above-mentioned.

2. Description of the Related Art

A system for delivering digital image data to many and unspecified users via a public line network is known. This system has been expected in a system whose efficiency is good for both an image provider and a user.

A so-called electronic distributed press, which takes advantage of such a system and delivers through a network a printed publication hitherto distributed through the medium of paper, has also been viewed as an important method. Especially, the case of electrically performing the delivery of advertisements and catalogues of goods and printing them at a general user's home has been viewed as an excellent advertising medium in place of direct mail, because information can be provided only for a user who desires to have the information, without waste and a provider can also collect latent customer information.

Incidentally, although the cost of generating such commercially distributed goods should be originally charged to an information provider side, in the existing circumstances the communication expense of accessing data, expendable supply expense for printing, electric expense and the like will be all charged to a user. This fact has resulted in the cause of the obstruction of the spread of the above-mentioned excellent information delivery system.

In contrast to this, it has also been considered that information printing expense is cashed back to a user side, for example, by causing a user to input his or her ID in down-loading an advertisement page. In that case, however, there is no means of confirming that printing was actually performed, this fact constituting an obstacle to the spread of the system.

On the other hand, as indicated in Japanese Unexamined Patent Publication No. 9(1997)-191394 and Paper for The Institute of Electronics, Information and Communication Engineers, D-2, Vol. J80-d-2 No. 5, 1997, a method of embedding into digital image data the related information as "an electronic watermark" has been proposed. This electronic watermark is embedded into data as deep auxiliary information such that it is not recognized by ordinary human sense, when data embedded with the watermark is used for its original purpose. That is, for example, the information, which is embedded in image data, is embedded, for example, into a signal component corresponding to an extremely high space frequency so that the contents of the deep auxiliary information are not visually recognized, when the image data is used to reproduce an image.

If this electronic watermark technique is utilized, auxiliary information can be embedded inseparably from image data that is contents. Therefore, it is possible to set information so that it cannot be taken out, unless all image data is actually downloaded. From the fact that information has been taken out, it can be verified that advertisement data has been fully accessed.

However, if the taken information is embedded into another image and delivered, fraudulent utilization such as substitution of advertisement data will become possible. In addition, a fraudulent demand for payment becomes possible by delivering a copy of extracted data to someone else. Thus, there is a possibility that a variety of problems will arise.

From such points, a method capable of reliably proving the downloading of advertisement and propaganda page data at a client side has been desired.

While the aforementioned has been described with relation to problems with delivery of image data, the same demand is also present for the case where voice data, representing music and the like, and the other data are delivered to many and unspecified users.

SUMMARY OF THE INVENTION

The present invention has been made in view of the above-mentioned circumstances. Accordingly, it is an object of the present invention to provide a data delivery method which is capable of specifying a person receiving data such as image data and reliably verifying a range of received data.

The data delivery method according to the present invention is a data delivery method of delivering data, such as image data, voice data and the like, comprising the steps of:

specifying an embedding position over a predetermined range in data, such as image data, voice data and the like, and embedding specific information, at a data deliverer side; and reading out said specific information by employing information reading means to which said embedding position is made known and also encrypting and outputting the read information along with information to specify a receiver, at a receiver side receiving data delivery.

Note that in a preferred form of this data delivery method, said embedding position is changed for each receiver receiving data delivery. Also, said data, such as image data, voice data and the like, can be delivered via a public line network. The present invention is not limited to this, but the data can also be delivered in the form of a floppy disk having stored it.

In another preferred form of the data deliver method of the present invention, information reading is performed with a printer at the receiver side and information to specify said printer is output from said printer as said information to specify a receiver.

Furthermore, it is preferable that said encrypted output be returned to the data deliverer side via a public line network and the like.

The present invention also provides a storage medium having stored software for executing the above-mentioned data delivery method.

In the data delivery method of the present invention, a data deliverer embeds specific information, for example, by changing an embedding position for each receiver, while at a receiver side the above-mentioned specific information is read out by employing the information read means that the embedding position has been made known to. Therefore, it can usually be considered that only a receiver intended by the data deliverer can read out the above-mentioned specific information. That is, it may safely be said that the fact itself that the above-mentioned specific information has been read out has verified that the reader has been a receiver intended by the data deliverer.

Hence, when the embedded information and receiver specification information, encrypted and output from a receiver side, are decoded at a data deliverer side, it can be confirmed that the data in a range embedded with the information has been delivered to a receiver side intended by the data deliverer, if the embedded information is correctly set forth.

Also, a person receiving data can be specified by confirming the information to specify a receiver. Hence, based on the confirmation, payment of printing expense can be determined. In addition, it is confirmed whether or not a receiver has charged duplication of printing expense, and so on.

And since the embedded information and the information to specify a receiver are both encrypted and output, it becomes extremely difficult for a malicious person to analyze this data and embed the other contents, or to change the receiver specification information, and so on.

Note that the above-mentioned embedding position does not need to be always changed for each receiver, but may be a specific one determined by the data deliverer. In other words, in such a case, if the embedding position is secretly made known to only receivers intended by the data deliverer, a receiver not intended by the data deliverer can be prevented from knowing the embedding position.

BRIEF DESCRIPTION OF THE DRAWINGS

FIG. 3 is a schematic block diagram showing the construction of an apparatus for carrying out a first example of an information embedding method that utilizes color coordinates;

FIG. 4 is a schematic block diagram showing the construction of an apparatus for calculating a quantization error (outside a gamut) in the information embedding apparatus;

FIG. 5 is a schematic block diagram showing the construction of an apparatus for calculating a quantization error (inside the gamut) in the information embedding apparatus;

DESCRIPTION OF THE PREFERRED EMBODIMENTS

Figure 1:
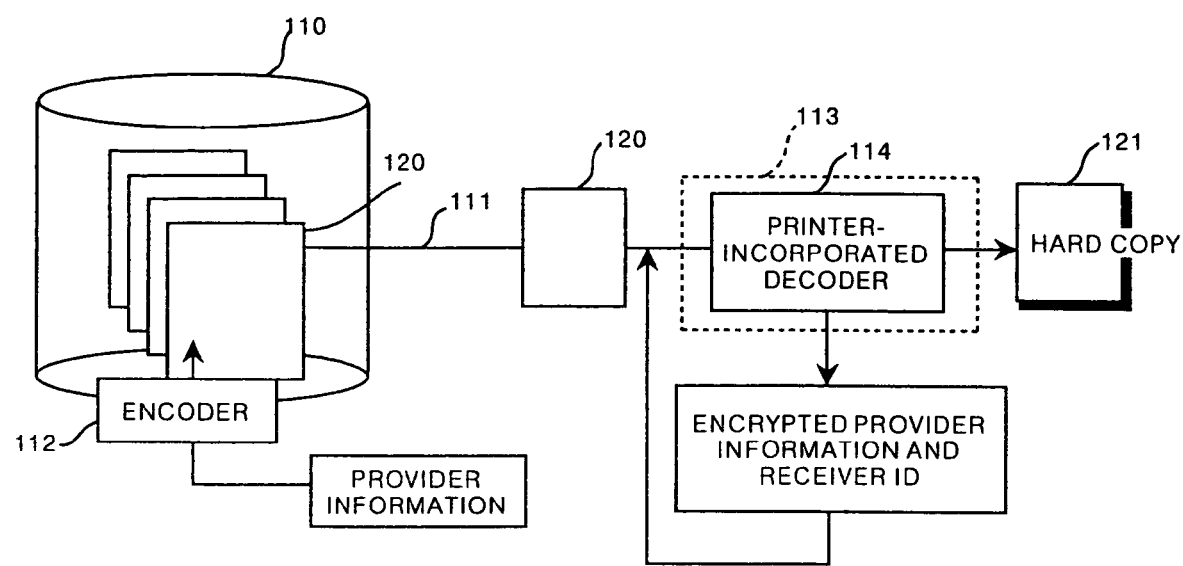
FIG. 1 is a block diagram showing an example of a system for carrying out a data delivery method of the present invention.

Embodiments of the present invention will hereinafter be described with reference to the drawings. FIG. 1 shows an example of a system for carrying out a data delivery method of the present invention. Note that while, in this example, the delivery of still-picture data by an image data delivery server is considered, the case of delivering the other data, such as voice and dynamic data and the like, can also be considered similarly.

An image server 110 accommodates image data for a great number of image sheets. Those image data have information about a copyright holder attached thereto. The image server 110 is connected on a public line network 111 so that it can receive a connection and a request to deliver an image from many and unspecified clients (customers). Also, a watermark encoder 112 capable of inseparably embedding related information into image data 120 is connected to the image server 110, provider information (specified information) such as copyright-holder information being embedded into the image data 120 inseparably from the image data by this watermark encoder 112. Note that this provider information may be encrypted as occasion demands.

This process of embedding information employs, for example, the following method. First, assume that the original image of an author is O (n×m pixels, 3 8-bit colors). This image is divided into blocks $a_{ij}$ of 3×3 pixels. Note that $i=1, \ldots n/3$ and $j=1, \ldots m/3$. Here, $a_{ij}$ can be divided into 8 bit planes $Ra_{ij}(p)$, $Ga_{ij}(p)$, and $Ba_{ij}(p)$ (where $p=1, \ldots 8$) for each color. Each bit plane is a set of 3×3 bits and able to represent information of 1 byte+1 bit.

If, with respect to this bit plane, embedment is performed varying a color or p at random for each block, the position can be concealed. If information is embedded varying the above-mentioned embedding position in a method that an image holder, in other words, only a server manager in this case can know, then holder information and user information can be embedded inseparably without being known to a third person. It is also possible to suppress picture degradation to the minimum by optimally adjusting this embedding position.

A printer 113 is connected to the above-mentioned image server 110 through the public line network 111. This printer 113 has a read unit (decoder) 114 incorporated therein. This read unit 114 is provided from a data deliverer for each user (data receiver) previously registered, a printer number allocated peculiarly for each printer being stored there.

And for example, by transmitting the above-mentioned printer number from the read unit 114 of each printer 113 to the image server 110 side when a data receiver sends a request to deliver an image, the aforementioned provider information is embedded at a position that can be interpreted with the printer 113 alone. The read unit 114 temporarily stores the delivered image data 120 in a buffer and performs the process of reading out the provider information there. Also, the printer 113 outputs a hard copy 121, based on the image data 120.

The read unit 114 encrypts and outputs the read provider information by a predetermined cryptographic algorithm along with information to specify a receiving side (receiver ID), such as an ID peculiar to a printer. As the form of this output, various forms can be adopted. For example, the read information is displayed on the display of the printer 113 or printed outside the image frame of the hard copy 121.

This encrypted data is sent back to the image deliverer side, for example, through the public line network 111. The image deliverer side decodes the cryptograph in accordance with a predetermined algorithm and separates it into an image embedment information (provider information) portion and a receiver specification information (receiver ID). Then, if the image embedment information portion is correctly set forth, it can be confirmed that the image data 120 in a range embedded with the information has been delivered to the printer 113 with reliability. The reason is as described in detail supra.

And the provider information and the receiver ID show that the delivered image has been printed, and are used, for example, as verification when printing expense is charged. At this time, if the receiver ID is confirmed, it can also be confirmed whether or not the receiver has charged duplication of printing expense, and so on.

In addition, since the provider information and the receiver ID are both encrypted and output, it becomes extremely difficult for a malicious person to analyze this data and embed the other contents, or to change the receiver ID, and so on.

While the aforementioned has been described with relation to the case where the embedded-information reading means is incorporated into a printer, it is possible to carry out the method of the present invention in the same manner even in the case of displaying an image with a display such as a CRT display. In that case, an embedded-information detection function is added to dedicated viewer software, and at the stage that reproduction of digital contents, such as a voice, a dynamic image and the like, has been completed, the embedded information and the receiver information are both encrypted and output.

Figure 2:
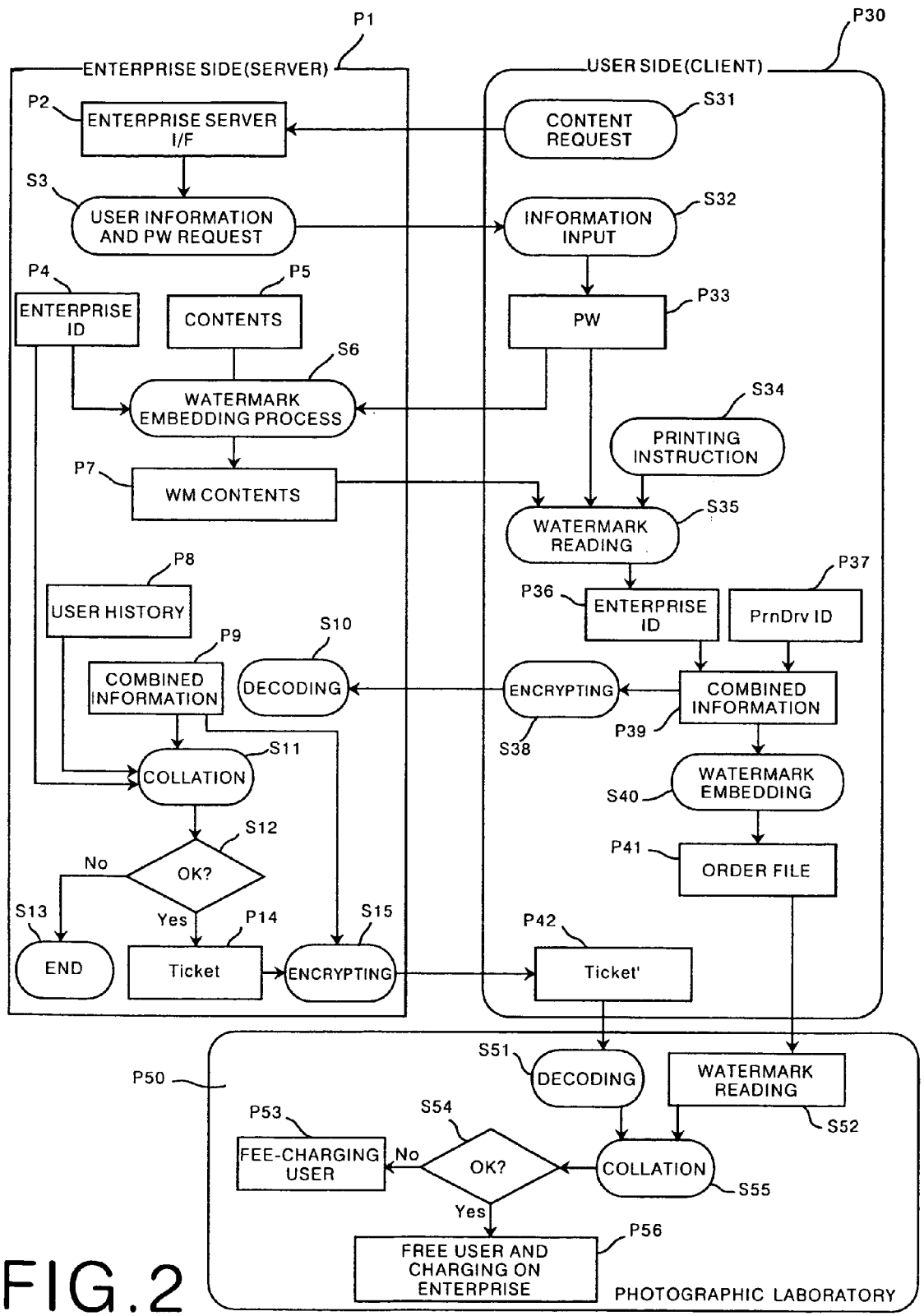
FIG. 2 is a block diagram showing another example of the system for carrying out the data delivery method of the present invention.

Next, another embodiment of the present invention will be described with reference to FIG. 2. As an example, this embodiment applies the present invention in order for a certain enterprise to deliver a propaganda calendar to users, FIG. 2 schematically showing a data delivery system therefor. Note that in the same figure, various processes are indicated by numbers added with "S" at their heads and various kinds of data are indicated by numbers added with "P."

In this embodiment, as illustrated in the figure, various data, including image data to be delivered, are transmitted and received between a server computer system at an enterprise side (hereinafter referred to as an enterprise server) P1 and a client computer system at a user side (hereinafter referred to as a client computer) P30. Note that this transmission-reception of data is performed, for example, by utilizing an internet or a dedicated internet.

A user who desires to receive the calendar of the enterprise has access to the enterprise server P1 by operating the client computer P30 and inputs a content request to an enterprise server interface (I/F) P2 (step S31), thereby opening a calendar down-loading screen. In the downloading screen, a request to input user information and a password (PW), which is previously given from the enterprise, is output prior to down-loading (step S3). The user views this request and inputs general information, such as one's address and name, and the password (step S32). With this, the enterprise side can obtain user information.

If the enterprise server P1 receives the password P33 input in this manner, the server embeds enterprise specification information (enterprise ID) P4 as an electronic watermark into contents P5 including advertisement information to be provided, particularly the advertisement information portion (step S6). As this specification information, various pieces of information, such as a company name and a trade name, are applicable. This embedment of information is performed employing specific watermark embedding software, and in accordance with the algorithm, the information can be embedded while changing the position in accordance with the user's password. The contents embedded with the electronic watermark in the aforementioned manner, that is, watermark (WM) contents P7 are transferred to the client computer P30.

As the above-mentioned electronic watermark embedding method, a method of utilizing the hole of a color coordinate occurring at the time of color conversion, for example, can be utilized. In that case, it is preferable to change the position of a color coordinate at which information is embedded, in accordance with a user's password. Note that this information embedding method taking advantage of color coordinates will be described in detail infra.

If the user prints the image data down-loaded from the aforementioned downloading screen with his printer, the user can use the data as a calendar. Also, if the user generates an image file for an order with a dedicated printer driver provided by a predetermined photographic laboratory and transmits or brings it to the photographic laboratory, the user can obtain a calendar print of extremely high quality.

However, since the expense required for printing at the laboratory is the self-charge of the user, there is a possibility that the calendar with the propaganda of the enterprise will be less attractive for the user, considering the expense. Particularly, the propaganda portion of the print is less valuable for the user and is also a major cause of increasing the printing cost, so deleting the propaganda portion on the down-loaded digital data and then printing is a better way.

In the embodiment of the present invention, a calendar including a propaganda portion as well is printed in consideration of such circumstances on the user side. That is, in the case of a printer incorporating software for reading out a specific electronic watermark or a laboratory print order using a printer driver, the user can perform printing without the charge of a fee. A description will hereinafter be made of the laboratory printing in this embodiment using a printer driver.

If the client computer P30 detects that an electronic watermark has been embedded into the watermark contents P7 transferred from the enterprise server P1, the client computer P30 urges the user to perform specification of laboratory printing and input of the password. If, in step S34, specification of laboratory printing is made with correct password input, the printer driver within the client computer P30 reads out the electronic watermark information embedded into the image from the watermark contents P7 (step S35).

If the printer driver reads out the electronic watermark information completely, the printer driver generates combined information P39 combining the enterprise specification information (enterprise ID) P36 indicated by the electronic watermark and the ID information P37 peculiar to each driver provided in the printer driver software; encrypts it (step S38) and outputs as a file; and embeds the information in electronic watermark form into an order file P41 (step S40). Note that when a user cuts out the advertisement portion of the calendar or performs only the printing specification of part of the calendar, embedded information cannot be correctly generated.

The above-mentioned encrypted file information is transferred to the enterprise server P1 through a network. The enterprise server P1 decodes and interprets the encrypted information (step S10) and collates the stored customer history P8 and enterprise ID P4 with the embedded information, the driver ID and the like indicated by the interpreted combined information P9 (step S11), thereby confirming whether the contents originated in the information really belong to the enterprise, whether or not the user has charged duplication of printing expense, and so on (step S12).

When the enterprise server P1 judges by the confirmation that there is no illegality, the enterprise server P1 issues print ticket information P14 toward the user; encrypts it (step S15); and transfers to the client computer P30 through a network. This print ticket information P14 includes information corresponding to the information embedded into the aforementioned order file P41. Note that when, in step S12, illegality is recognized, the process ends there (step S13).

The user carries the aforementioned order file P41 and the print ticket information P14, which was received through a network, in the laboratory. Note that instead of this carrying in, information may be transferred through a network. In the laboratory, the following process is performed by a dedicated computer system (hereinafter referred to as a laboratory computer system) P50.

First, the laboratory computer system P50 decodes the encrypted print ticket information P42 (step S51); also reads out the information embedded into the image of the order file P41 by the dedicated watermark reading software (step S52); and collates both (step S55). With this collation, it is discriminated whether or not the print ticket and the ordered image correspond to each other (step S54). If they correspond to each other, the laboratory makes the printing fee of the user free and obtains it by charging P56 on the enterprise. When the print ticket and the ordered image do not correspond to each other, the laboratory presents a fee-charging printing fee P53 and receives it directly from the user.

According to the embodiment described above, it becomes possible for an enterprise side to perform propaganda information attached content delivery service with respect to an original user without disturbance from a malicious person.

Note that while, in this embodiment, the process of extracting information embedded into an image and confirming it to an enterprise side has been performed at a user side, it is also possible to perform confirmation to the enterprise side at the laboratory, by extracting the embedded information and embedding the information into the order file P41 in watermark form along with a printer driver ID.

Also, in the case where, in the above-mentioned example, different pieces of information are embedded into the entire image and only a portion is printed (e.g., case where only some months of a yearly calendar are printed) and like cases, it is also possible to vary a fee in accordance with a printed area. In addition, it is possible to embed an electronic watermark into an image area including a propaganda portion and to substitute another image (user's image, etc.) for a certain portion.

An information embedding method taking advantage of color coordinates will hereinafter be described with reference FIG. 3 and the figures thereafter. FIG. 3 is a schematic block diagram showing the construction of an information embedding apparatus for carrying out a first example of the information embedding method taking advantage of color coordinates. As shown in FIG. 3, this information embedding apparatus includes: color conversion means 1 for performing color conversion of image data S0, also embedding auxiliary information H1 coded as described infra, and for generating image data S1 embedded with the auxiliary information H1; coding means 2 for coding information H0 to be embedded and for obtaining coded auxiliary information H1; and table generation means 3 for generating a table for coding the information H0 in the coding means 2.

Note that as information H0 to be embedded in image data S0 in this example, ID information peculiar to a driver, an enterprise ID, a trade name and the like provided in printer driver software, copyright information of the image data S0, certified information, photographing conditions when the image data S0 was photographed, comments at the photographing time, a photographed date, lens information of a camera used in photographing, information about whether a stroboscope was used, information on a film kind and the like, a photographer's name, read conditions during reading if the image data S0 was read from film or a printed image, retrieval information of the image data S0 and the like are enumerated.

In the color conversion means 1, a color conversion table for embedding the auxiliary information H1 is generated based on a quantization error between a first color space to which the image data S0 belongs and a second color space which is a destination of conversion, and based on this table, color conversion of the image data S0 is performed.

FIG. 4 is a schematic block diagram showing the construction of an apparatus for calculating the quantization error between the first and second color spaces. As shown in FIG. 4, this apparatus includes: first color space information acquisition means 11 for acquiring color space information of the first color space that the image data S0 belongs to; first gamut information acquisition means 12 for acquiring gamut information representing the boundary of the first color space, based on the first color space information acquired by the first color space information acquisition means 11; second color space information acquisition means 13 for acquiring color space information of the second color space that is the conversion destination of the image data S0; second gamut information acquisition means 14 for acquiring gamut information representing the boundary of the second color space, based on the second color information acquired by the second color space information acquisition means 13; compression-method selection means 15 for selecting a method of compressing data that is outside the gamut, based on a difference between the gamut information of the first color space and the gamut information of the second color space; and quantization error decision means 16 for deciding a quantization error that is outside the gamut, based on both the method of compression selected by the compression-method selection means 15 and the gamut information of the first and second color spaces.

On the other hand, a quantization error inside the gamut is calculated by an apparatus shown in FIG. 5. The apparatus shown in FIG. 5 includes: the first color space information acquisition means 11 shown in FIG. 4; the second color space information acquisition means 13 shown in FIG. 4; and quantization error decision means 17 for deciding a quantization error that occurs between color coordinates at the time of conversion because of a geometrical color coordinate difference inside the gamut, that is, a geometrical difference in array between the color coordinate of the first color space and the color coordinate of the second color space, based on the first and second color space information.

Figure 6:
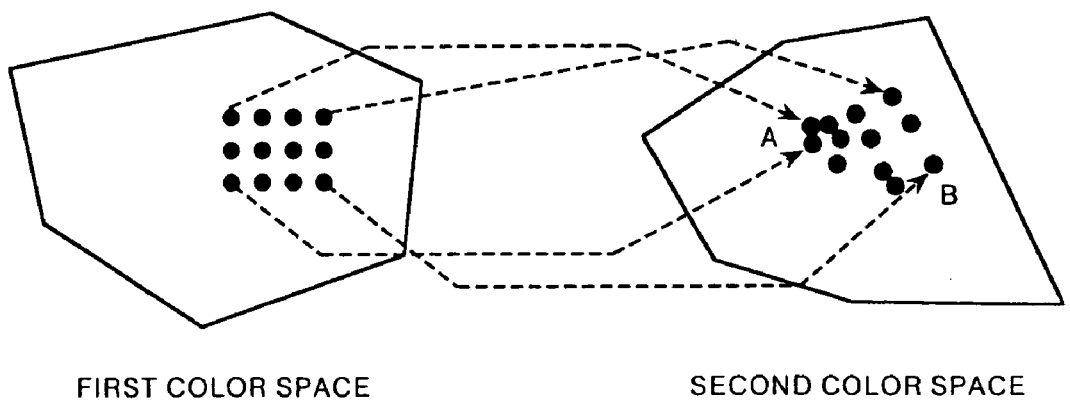
FIG. 6 is a diagram for describing a quantization error (one of the two)
Figure 7:
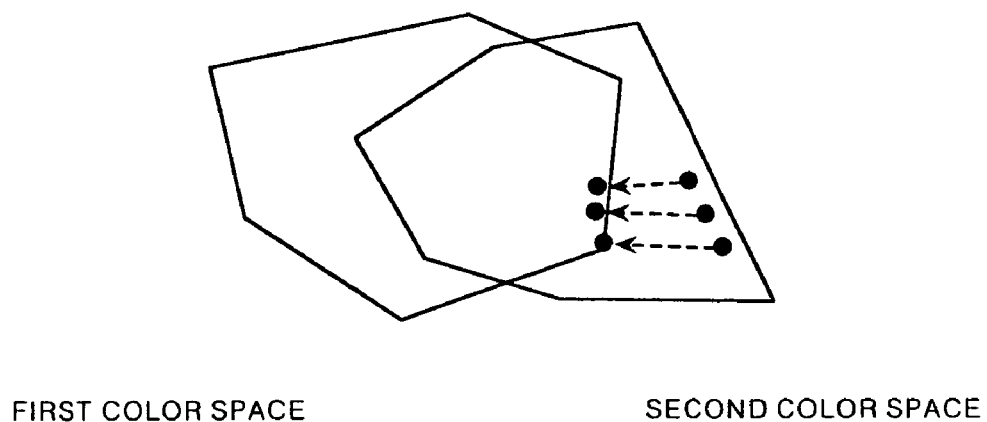
FIG. 7 is a diagram for describing a quantization error (another of the two)

Here, a description will be made of the quantization error based on the difference between the color spaces. FIGS. 6 and 7 are diagrams for describing the quantization error. If the color coordinates arranged regularly in the first color space are mapped onto the second color space, as shown in FIG. 6, methods of quantization will differ from each other because both color spaces differ in color reproducibility, and consequently, spatial distortion will occur. For instance, if a certain color coordinate in the first color space is mapped toward A in the second color space, the resolution will shrink and a shrinkage in the number of quantizations will arise. If, on the other hand, mapping is performed toward B, the resolution will be lost and an increase in the number of quantizations will arise. Thus, if a shrinkage and an increase in the number of quantizations arise, a quantization error will occur there.

Next, as shown in FIG. 7, consider the case of performing a conversion from the first color space to the second color space. As shown in FIG. 7, because of a difference in gamut (boundary as a color space) between the first and second color spaces, both a portion where the color spaces overlap and portions where they do not overlap will occur. Since the portion of the second color space protruding from the first color space (i.e., the portion outside the gamut) cannot be expressed in the first color space, there is a need to compress the protruding portion toward the center of the first color space, as shown in FIG. 7, for example. If the color space is compressed in this way, the second color space will lose an amount of information as a whole, so that a shrinkage in the number of quantizations will occur, resulting in a quantization error. Note that as a method of compressing a color space, not only the method of compressing a protruding portion toward the center of the first color space, but various methods, such as a method of compressing a protruding portion with greater force as it goes away from the first color space and a method of compressing a protruding portion, not in a central direction, but in a tangential direction with respect to a central axis, can be employed. And the above-mentioned compression-method selection means 15 shown in FIG. 4 selects this method of compressing data which is outside the gamut.

If one color space is thus converted to another color space whose color reproducibility is different from the one color space, a shrinkage or an increase in the number of quantizations will always arise because of a difference in the resolution of the quantization between color spaces, resulting in a quantization error. This example is directed to embedding auxiliary information H1 into an area where a quantization error will occur due to this shrinkage and increase in the number of quantizations. Here, in the present invention, two embedding methods are considered for each of the cases where the number of quantizations shrinks and increases.

Figure 8:
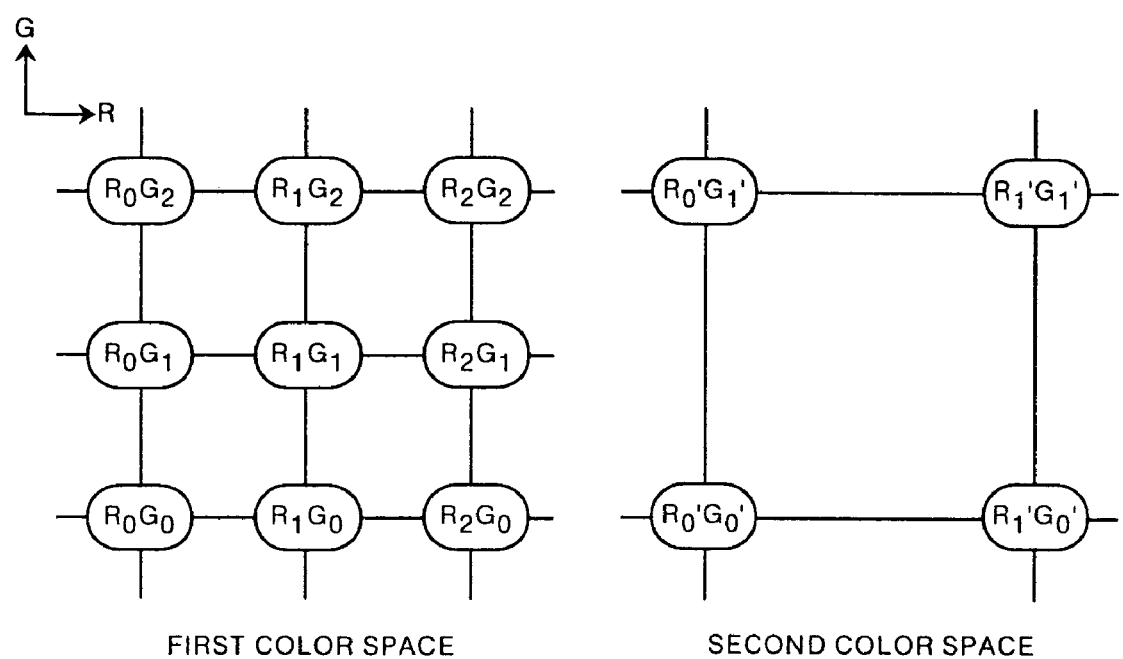
FIG. 8 is a diagram showing a model for describing embedment of auxiliary information into a quantization error area in the case where the number of quantizations shrinks.

First, a description will be made with relation to the case of embedding auxiliary information into a quantization error when the number of quantizations shrinks. FIG. 8 is a diagram showing a model for describing embedment of auxiliary information into a quantization error area in the case where the number of quantizations shrinks. Note that in FIG. 8, for the convenience of explanation, a three-dimensional RGB color space is shown two-dimensionally with the axis of abscissas as a R axis and the axis of ordinates as a G axis, a B axis in the direction perpendicular to the paper surface being omitted. Here, the first color space is, for example, a s-RGB color space corresponding to a standard CRT monitor signal and the like, and in FIG. 8, a color area of three variation steps of the color coordinates of each of the RGB axes is shown in the RGB color space quantized to 8 bits (R, G, B=0–255). In FIG. 8, the R and G axes alone are shown, so this color area can take 9 colors consisting of color coordinates of $R_0G_0$, $R_0G_1$, $R_0G_2$, $R_1G_0$, $R_1G_1$, $R_1G_2$, $R_2G_0$, $R_2G_1$, and $R_2G_2$.

Also, the second color space is, for example, a color space corresponding to a printer exposure signal, and as with the first color space, a three-dimensional RGB color space is shown two-dimensionally with the axis of abscissas as a R axis and the axis of ordinates as a G axis, a B axis in the direction perpendicular to the paper surface being omitted. For the color area of the second color space equal in color to the color area of the first color space having 9 color coordinates of $R_0G_0$, $R_0G_1$, $R_0G_2$, $R_1G_0$, $R_1G_1$, $R_1G_2$, $R_2G_0$, $R_2G_1$, and $R_2G_2$, the first color space has three steps for each axis, but the second color space has only two steps for each axis, so that the resolution of the quantization is reduced. Thus, although the first color space has 9 color coordinates of $R_0G_0$, $R_0G_1$, $R_0G_2$, $R_1G_0$, $R_1G_1$, $R_1G_2$, $R_2G_0$, $R_2G_1$, and $R_2G_2$, in the second color space the 9 color coordinates become 4 color coordinates of $R'_0G'_0$, $R'_0G'_1$, $R'_1G'_1$, and $R'_1G_1$, as shown in FIG. 8. Here, assume that the 4 color coordinates in the second color space is equal in color to the first color space for simplification. If it is also assumed that the step width in the first color space is incremented equally by a color difference of $\Delta E=1$ corresponding to an amount of perception, the corresponding color area in the first and second color spaces shown in FIG. 8 becomes a rectangular color area whose magnitude of a side is $2\Delta E$.

Figure 9:
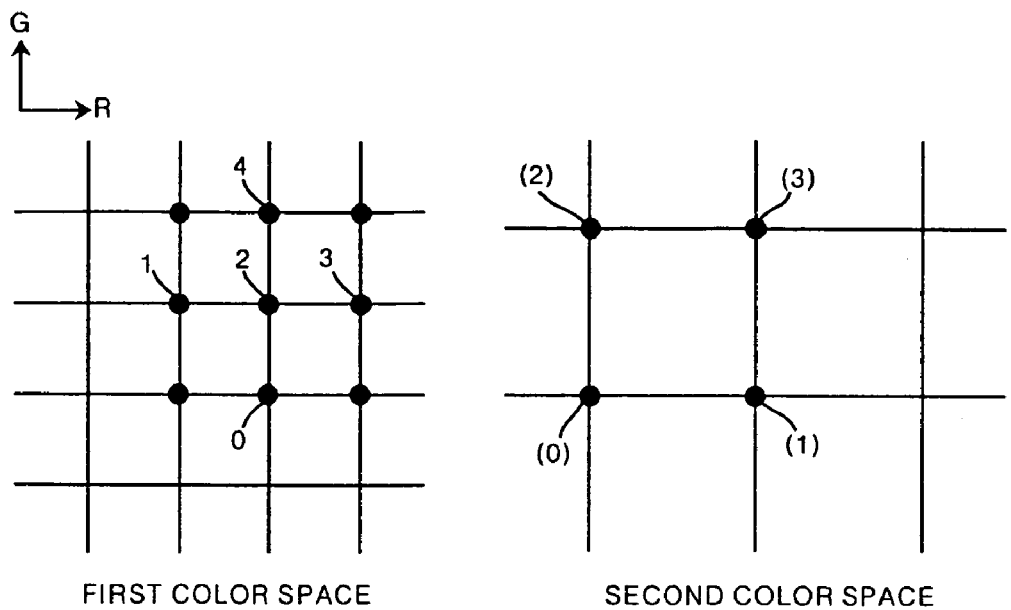
FIG. 9 is a diagram showing the state that, in the model shown in FIG. 8, numbers have been applied to color coordinates.

Here, the conversion from the first color space to the second color space becomes color conversion that 9 color coordinates shrink to 4 color coordinates; however, the 4 color coordinates corresponding to the corner portions of this color area are converted to corresponding color coordinates, respectively, because the first and second color spaces are equal in color. That is, the color coordinates $R_0G_0$, $R_0G_2$, $R_2G_0$, and $R_2G_2$ in the first color space are converted to the $R'_0G'_0$, $R'_0G'_1$, $R'_1G'_1$ and $R'_1G'_1$ in the second color space, respectively. On the other hand, the 5 color coordinates other than the corner portions in the first color space are converted to the second color space such that the color differences are as small as possible, respectively. Directing attention to these 5 color coordinates, a description will hereinafter be made. Note that for simplicity, numbers of 0, 1, 2, 3, and 4 are applied to the 5 color coordinates of $R_0G_1$, $R_1G_0$, $R_1G_1$, $R_1G_2$, and $R_2G_1$ in the first color space of FIG. 8, as shown in FIG. 9. Similarly, numbers of (0), (1), (2), and (3) are applied to the 4 color coordinates of $R'_0G'_0$, $R'_0G'_1$, $R'_1G'_0$, and $R'_1G'_1$ in the second color space.

Figure 10:
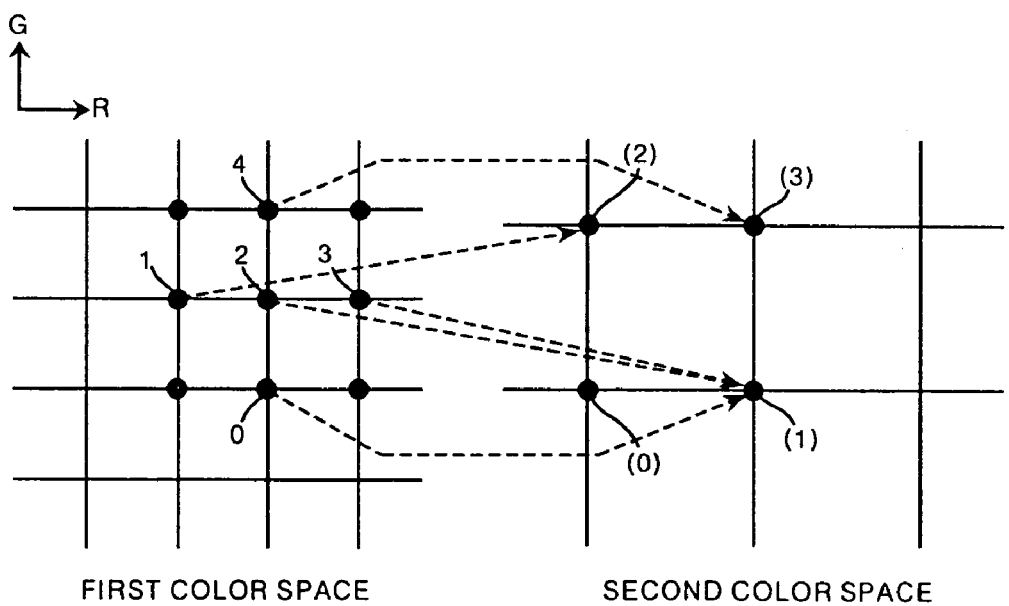
FIG. 10 is a diagram showing an embedment example of auxiliary information in actual conversion in the model shown in FIG. 8.

When the color coordinate 0 in the first color space is converted onto the second color space, the color coordinate 0 is converted to either the color coordinate (0) or (1) whose color difference $\Delta E$ becomes least before and after conversion. Also, when the color coordinate 2 in the first color space is converted onto the second color space, the color coordinate 2 is converted to any of the color coordinates (0), (1), (2), and (3), because the color difference $\Delta E$ before and after conversion is the same for each of the color coordinates (0), (1), (2), and (3). Thus, for the color coordinates 0, 1, 3, and 4 in the first color space, there are 2 degrees of freedom in the coordinate of the second color space of the conversion destination, so each coordinate can be made to have 1-bit information. Also, for the color coordinate 2 in the first color space, there are 4 degrees of freedom and therefore the color coordinate 2 can be made to have 2-bit information. These states are shown in Table 1. Therefore, it is possible to represent 6-bit information when conversion is performed from the first color space onto the second color space. For example, if the upper row of the color coordinates of the second color space is caused to correspond to 0 and the lower row to 1 in the case of the color coordinates 0, 1, 3, and 4 of the first color space in Table 1, as shown in Table 2 and if the top row is caused to correspond to 00, the second row to 01, the third row to 10, and the fourth row to 11 for the color coordinate 2 of the first color space in Table 1, as shown in Table 3, then 6-bit information "110101" is represented when color conversion is made like 0→(1), 1→(2), 2→(1), 3→(1), and 4→(3), as shown in FIG. 10.

TABLE 1

| Color coordinates in the first color space | 0 | 1 | 2 | 3 | 4 |
|---|---|---|---|---|---|
| Color coordinates in the second color space | (0) (1) | (0) (2) | (0) (1) (2) (3) | (1) (3) | (2) (3) |

TABLE 2

| Color coordinates in the first color space | 0 | 1 | 3 | 4 | |
|---|---|---|---|---|---|
| Color coordinates in the second color space | (0) (1) | (0) (2) | (1) (3) | (2) (3) | 0 1 |

TABLE 3

| Color coordinate in the first color space | 2 | |
|---|---|---|
| Color coordinates in the second color space | (0) | 00 |
| | (1) | 01 |
| | (2) | 10 |
| | (3) | 11 |

In order to embed the information H0 into the image data S0, the information H0 is coded to a 6-bit value to obtain the coded auxiliary information H1 by referring to a table generated by the table generation means 3, and a color conversion table from the first color space onto the second color space, which corresponds to the code of the auxiliary information H1, is generated. For example, when the auxiliary information H1 coded to 6 bits is "110101," the color conversion table converts the image data S0 from the first color space to the second color space such that color coordinates are converted like 0→(1), 1→(2), 2→(1), 3→(1), and 4→(3), as shown in FIG. 10.

In this case, even if any information is assigned to the 6-bit value, the information will hardly be conspicuous, because the color difference $\Delta E$ between color coordinates before and after the conversion from the first color space to the second color space is $\Delta E \leq \sqrt{2}$ for all the color coordinates.

On the other hand, in order to read out the embedded auxiliary information H1, all that are required is to have: (1) image data S0 before color conversion; (2) a color conversion table representing a corresponding relationship between the first and second color spaces, equivalent to the above-mentioned Table 1; and (3) a table (table generated by the table generation means 3) representing a corresponding relationship between the coded auxiliary information H1 and the information H0. In this case, the positions of specific colors (here, colors at the color coordinates numbered 0, 1, 2, 3, and 4) on an image, represented by the image data S0 before color conversion, are calculated. These positions will correspond, on the image represented by the image data S1 after color conversion, to the positions at which the auxiliary information H1 is embedded. And at a position that a specific color before conversion is present, it is detected what color the color at this position has been converted to after color conversion, whereby a color coordinate corresponding to the converted color is calculated. And the 6-bit auxiliary information H1 can be read out by both the corresponding relationship between the color coordinate before conversion and the color coordinate after conversion and Table 1. Furthermore, by referring to the table that causes the auxiliary information H1 and the information H0 to correspond with each other, the information H0 can be obtained.

Note that although, in the above-mentioned example, each color coordinate is caused to have bit information separately, it is also possible to cause the entire color area to have information in the following manner. For instance, in FIG. 9 the color coordinates 0, 2, 4 in the first color space cause color errors in the direction of R by a color conversion onto the second color space. If the sum total of the color errors in the R direction of these three color coordinates is assumed to be $\Delta Er$, $\Delta Er$ can take 4 values: $\Delta Er = -3, -1, 1,$ and 3. For $\Delta Er = -1$ and $\Delta Er = 1$ of these values, 6 combinations can be taken as a method of converting color coordinates. For example, the case of $\Delta Er = -1$ has the 6 following combinations:

[0 -> (0), 2 -> (0), 4 -> (3)] . . . (a)
[0 -> (0), 2 -> (2), 4 -> (3)] . . . (b)
[0 -> (0), 2 -> (1), 4 -> (2)] . . . (c)
[0 -> (0), 2 -> (3), 4 -> (2)] . . . (d)
[0 -> (1), 2 -> (0), 4 -> (2)] . . . (e)
[0 -> (1), 2 -> (2), 4 -> (2)] . . . (f)

In all these combinations, ΔEr is the same. Therefore, even if color conversion is performed by any of the combinations, a color difference could hardly be perceived on an image after conversion. Therefore, a difference in a perceived color becomes insignificant by using 6 combinations (a) to (f) as a code representing the auxiliary information H1, so it becomes possible to embed the auxiliary information H1 into the image data S0 in a manner that a color difference is more difficult to recognize visually. Note that in this case, the information H0 to be embedded is coded to any symbol of the above-mentioned 6 combinations (a) to (f) by the coding means 2, whereby the coded auxiliary information H1 is represented by any symbol of (a) to (f).

Furthermore, it is also possible to embed the auxiliary information H1 by employing a pair of combinations that 3 color coordinates in the conversion destination are all different, like the combinations (a) and (f) and combinations (b) and (e) in the above-mentioned combinations. For instance, combination (a) is caused to correspond to 1 and another combination (b) is caused to correspond to 0. And in embedding the auxiliary information H1 into the image data S0, color conversion employing a color conversion table that performs conversion like (a) is performed when the auxiliary information H1 coded to 1 is embedded and color conversion employing a color conversion table that performs conversion like (f) is performed when the auxiliary information H1 coded to 0 is embedded.

Also, when an image represented by the image data S0 is divided, for example, into three upper, intermediate, and lower image portions and information of 1 is embedded into the upper portion, information of 0 into the intermediate portion, and information of 1 into the lower portion, information can be embedded by switching color conversion tables, which perform conversion like (a) and (f), for each image area. In this case, even if conversion is performed by either color conversion table, there will be almost no color difference due to switching of color conversion tables at the boundary portion of each image area, because the sum total of errors ΔEr=−1. With this, it is possible to embed auxiliary information without being significantly recognized visually.

On the other hand, a method of embedding auxiliary information into a quantization error in the case where the number of quantizations increases will be described infra.

Now, a description will be made of the operation of the example of the present invention.

First, in the first color space information acquisition means 11 shown in FIGS. 4 and 5, the color space information of the first color space that the image data S0 belongs to is acquired, and the color space information of the second color space which is the color space of the conversion destination is acquired in the second color space information acquisition means 13. Then, in the first and second gamut information means 12, 13 shown in FIG. 4, the gamut information of the first color space and the gamut information of the second color space are acquired based on the first and second color space information. On the other hand, in the compression-method selection means 15, a method of compressing a coordinate value in the second color space that is outside the gamut is selected, and in the quantization error decision means 16, a quantization error of a color coordinate outside the gamut, which occurs when conversion is performed, is calculated based on the selected method of compression and the first and second gamut information. On the other hand, in the quantization error decision means 17 shown in FIG. 5, a quantization error of a color coordinate inside the gamut, which occurs when conversion is performed, is calculated based on the first and second color space information.

Also, in the table generation means 3 shown in FIG. 3, a table for coding information H0 to be embedded is generated and in the coding means 2 the information H0 is coded by referring to this table, whereby auxiliary information H1 is obtained. On the other hand, in the color conversion means 1, a color conversion table, which represents which color coordinate of a conversion destination a color coordinate of the first color space is mapped onto, is generated in converting the image data S0 from the first color space to the second color space, as described supra. And in converting the image data S0 from the first color space to the second color space by the color conversion means 1, the coded auxiliary information H1 is embedded into the image data S0, whereby image data S1 embedded with the auxiliary information H1 is obtained.

Thus, when the auxiliary information H1 is embedded in a direction that the number of quantizations shrinks, the auxiliary information H1 is embedded as a quantization error into a portion having originally no resolution with respect to a color space. Therefore, even if the image data S1 is reproduced, information will become difficult to recognize visually after output, whereby the auxiliary information H1 can be concealed and embedded into image data. Note that in order to read out the auxiliary information H1 thus embedded, the color conversion table and the table, which was generated in the table generation means 3, are necessary as described supra. For this reason, only specified persons having these tables can know the contents of the information H0, whereby the concealment of the information H0 can be held.

Figure 11:
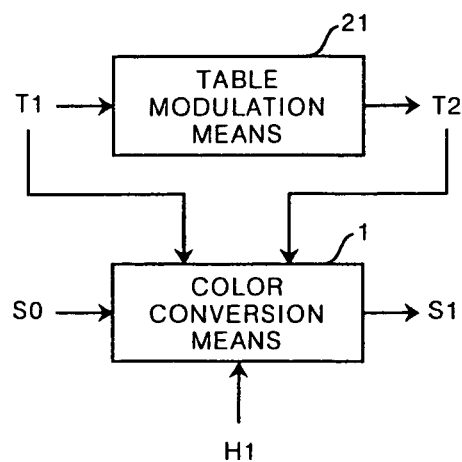
FIG. 11 is a schematic block diagram showing the construction of an apparatus for carrying out a second example of the information embedding method that utilizes color coordinates.

Next, a description will be made of a second example of the information embedding method that takes advantage of color coordinates. FIG. 11 is a schematic block diagram showing the construction of another information embedding apparatus for carrying out this method. As shown in FIG. 11, the information embedding apparatus according to the second example switches two kinds of color conversion tables T1 and T2 to embed auxiliary information H1 into image data S0 and generates image data S1 embedded with the auxiliary information H1, the apparatus including the same color conversion means 1 as the above-mentioned first example and table modulation means 21 which modulates a first color conversion table T1 and generates a second color conversion table T2.

Figure 12:
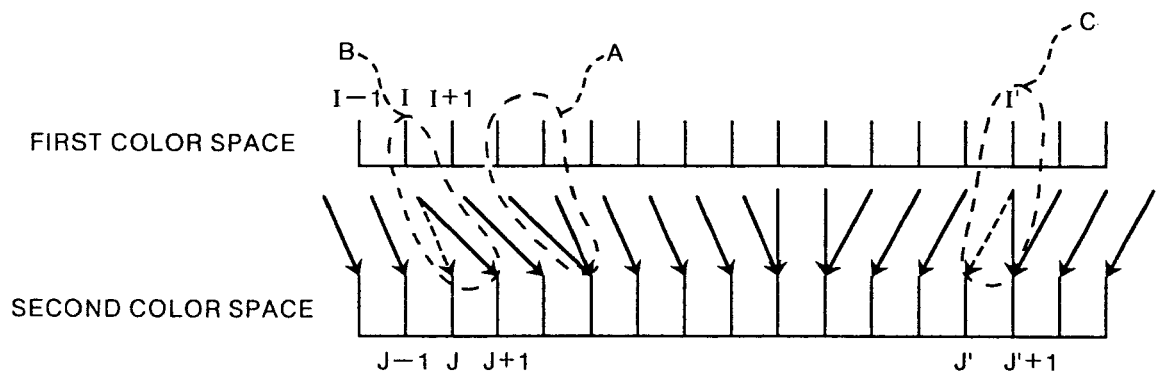
FIG. 12 is a diagram showing the state of conversion from a first color space onto a second color space.

The first color conversion table T1 converts a first color space, to which image data S0 belongs, to a second color conversion space and converts all color data, which the image data S0 can take in the first color space, to the second color space. Specifically, as shown in FIG. 12, each color coordinate in the first color space indicated in one dimension for convenience is converted as shown by solid arrows to a color coordinate indicated similarly one dimension. Here, in color area A enclosed by a broken line in FIG. 12, quantization resolution has been shrunk by color conversion, and in the above-mentioned first example, the auxiliary information H1 is embedded here. On the other hand, in color area B, quantization resolution has increased, and in the second example, the auxiliary information H1 is embedded here.

That is, a pixel in image data, which becomes the pixel (value) of color coordinate J in the second color space shown in FIG. 12, is neither originally present in the second color space nor used when conversion is performed employing the first conversion table T1 although present. In the second example, therefore, the color coordinate J is first calculated. When the color coordinate I in the first color space is converted by the first color conversion table T1, the first color conversion table T1 is modulated such that the color coordinate I is converted to the color coordinate J instead of being converted to the color coordinate J+1 in the second color space, whereby the second color conversion table T2 is obtained. The color conversion is performed switching the first and second color conversion tables T1, T2, whereby the auxiliary information H1 is embedded. Note that the color coordinate I selects one representing a color whose probability of appearance is relatively higher on an image represented by the image data S0.

Figure 13:
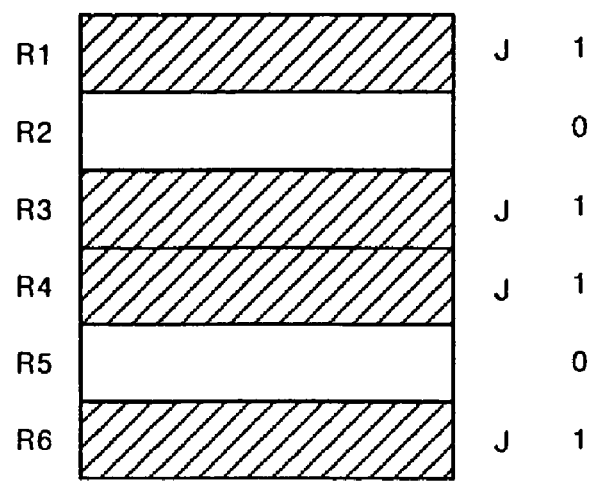
FIG. 13 is a diagram for describing the state of embedding auxiliary information.

The auxiliary information H1 is embedded into the image data S0 in the following manner. FIG. 13 is a diagram for describing the state that, in the second example, the auxiliary information H1 is embedded. As shown in FIG. 13, when the image data S0 has, for example, 1024×1536 pixels, an image represented by the image data S0 is divided into 6 image areas R1 to R6 having 1024×256 pixels. In this case, assume that a pixel represented by the color coordinate I is present in all the image areas R1 to R6. And in performing color conversion of the image data S0, the first color conversion table T1 is used for the image areas R2, R5, while the second color conversion table T2 is used for the image areas R1, R3, R4, R6. With this, in the image data S1 after conversion, the color coordinate I in the image data S0 before color conversion is converted in the image areas R2, R5 to the color coordinate J+1 and in the image areas R1, R3, R4, R6 to the color coordinate J. Therefore, if it is assumed that the case where the color coordinate J appears on an image represented by the image data S1 is 1 and that the case where the color coordinate J+1 appears is 0 and if it is detected for each of the image areas R1 to R6 whether or not the color coordinates J, J+1 are present, then 6-bit information can be embedded. Also, in the second color space the color coordinate J and the color coordinate J+1 are less than 1 quantization step, so a difference in color can hardly be recognized visually at the boundary portions of the image areas R1 to R6. Therefore, the auxiliary information H1 can be embedded without substantially degrading picture quality, compared with the case where the image data S0 is converted by the first color conversion table T1 alone. Note that in the example of the present invention, auxiliary information H1 of "101101" is embedded as shown in FIG. 13.

Notice that in order to read out the auxiliary information H1, whether or not the color coordinate J and the color coordinate J+1 are present is detected for each of the above-mentioned 6 image areas R1 to R6 of the image represented by the image data S1, whereby the auxiliary information H1 is calculated. By referring to the table (generated by the table generation means 3 of the first example) causing the auxiliary information H1 and the information H0 to correspond to each other, the information H0 can be obtained. Therefore, unlike the first example, the auxiliary information H1 can be read out without employing the image data S0 before color conversion. Note that in this case, the color coordinate J and the color coordinate J+1 are difficult to recognize visually because, in the second color space, they are less than 1 quantization step; however, a difference between the color coordinate J and the color coordinate J+1 can be detected as a digital value of the image data S1, because there is a difference in digital value therebetween.

In this case, the auxiliary information cannot be read out if it is not known which color coordinate is a color coordinate corresponding to embedment of the auxiliary information. In the present invention, only a specific receiver can read out information, by making this color coordinate position known to the specific receiver alone.

In the case where the auxiliary information H1 is embedded in a direction that the number of quantizations increases, as in this second example, the auxiliary information H1 can be embedded into the image data S0 without substantially degrading picture quality, compared with the case where color conversion is performed by employing the first color conversion table T1 alone, by embedding the auxiliary information H1 in accordance with whether the color coordinate I in the first color space is converted to the color coordinate J or color coordinate J+1 in the second color space, using the first and second color conversion tables T1, T2. In addition, even in the case of reading out auxiliary information H1, all that is required is to detect whether or not the color coordinate J and the color coordinate J+1 are present and therefore the image data S0 before color conversion becomes unnecessary, whereby detection of the auxiliary information H1 can easily be performed.

Note that although, in the above-mentioned second example, auxiliary information H1 has been embedded by switching whether the color coordinate I in the first color space is converted to the color coordinate J or J+1 in the second color space, the auxiliary information H1 may be embedded by switching whether the color coordinate I−1 or I+1 adjacent to the color coordinate I in the first color space is converted to the color coordinate J or J+1 in the second color space. In this case, although picture quality is slightly degraded due to a large difference in color as compared with the case of converting the color coordinate I to the color coordinate J or J+1, the auxiliary information H1 can be embedded into the image data S0 in the same manner as the second example.

In addition, in the case where, like the color coordinate J of the second color space shown in FIG. 12, a plurality of color coordinates, which are not used when conversion is performed by employing the first color conversion table T1, are present in the first color space, color conversion of the plurality of color coordinates can also be performed by using a color conversion table modulated on the basis of the same auxiliary information, and in reading out the auxiliary information, the logical OR between a plurality of results read out can be used. With this, the probability that information embeddable color coordinates are present in divided image areas can be enhanced.

Figure 14:
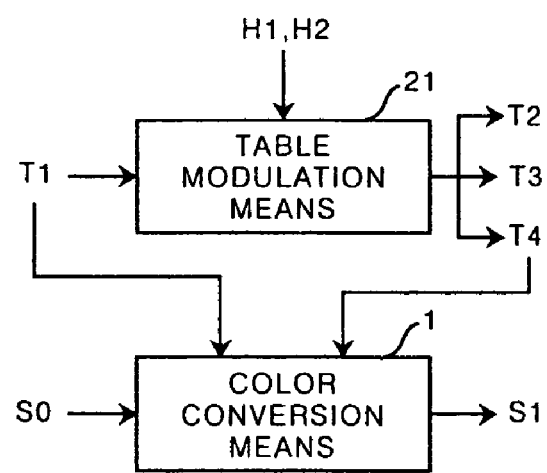
FIG. 14 is a schematic block diagram showing the construction of an apparatus for carrying out a third example of the information embedding method that utilizes color coordinates.

Next, a description will be made of a third example of the information embedding method taking advantage of color coordinates. FIG. 14 is a schematic block diagram showing the construction of an information embedding apparatus for carrying out this method. As shown in FIG. 14, this information embedding apparatus uses two kinds of pieces of auxiliary information H1, H2 separately representing two kinds of pieces of information H0, H0', such as information about a photographed date and information about a photographer of image data S0; generates third and fourth color conversion tables T3, T4 in addition to the second color conversion table T2; selects one color conversion table from the second color conversion table T2, third color conversion table T3, and fourth color conversion table T4 in accordance with the two kinds of pieces of auxiliary information H1, H2; and selectively embeds the two pieces of auxiliary information H1, H2 into the image data S0.

That is, in the above-mentioned second example, auxiliary information H1 has been embedded into image data S0 by switching the color coordinate I in the first color space to either the color coordinate J or color coordinate J+1 in the second color space. Similarly, in color area C shown in FIG. 10, information can be embedded by switching the color coordinate I' in the first color space to either the color coordinate J' or color coordinate J'+1 in the second color space. In the third example, therefore, a second color conversion table T2 similar to the above-mentioned second example is generated so that two kinds of pieces of information can be embedded. Also, when the color conversion I' is converted by the first color conversion table T1, the first color conversion table T1 is modulated such that the color conversion I' is converted to the color conversion J' instead of being converted to the color coordinate J'+1 in the second color space, whereby the third color conversion table T3 is generated. Note that it is assumed that in the second color conversion table T2, the color coordinate I' in the first color space is converted to the color coordinate J'+1 in the second color space in the same way as the first color conversion table T1, and in the third color conversion table T3, the color coordinate I in the first color space is converted to the color coordinate J+1 in the second color space in the same way as the first color conversion table T1. Also, assume that in the fourth color conversion table T4, the color coordinate I in the first color space is converted to the color coordinate J in the second color space and the color coordinate I' in the first color space to the color coordinate J' in the second color space.

And by dividing an image represented by the image data S0 into 6 image areas in the same manner as the above-mentioned second example and then switching the first color conversion table T1 and the second color conversion table T2 for each image area and thereby converting the image data S0 to the image data S1, auxiliary information H1 can be embedded into the image data S0. On the other hand, by switching the first color conversion table T1 and the third color conversion table T3 for each image area and thereby converting the image data S0 to the image data S1, the auxiliary information H2 can be embedded into the image data S0. The second color conversion table T2 and the third color conversion table T3 are switched according to which of the two pieces of auxiliary information H1, H2 is input to the table modulation means 21.

On the other hand, embedding the auxiliary information H1 and auxiliary information H2 simultaneously is also possible. That is, by dividing an image represented by image data S0 into 6 image areas in the same manner as the above-mentioned second example and then switching the first through the fourth color conversion tables T1, T2, T3, T4 for each image area and thereby converting the image data S0 to the image data S1, the auxiliary information H1 and auxiliary information H2 can be embedded into the image data S0. In this case, the contents of the auxiliary information H1 and auxiliary information H2 are decided for each image area, and when, for example, in a certain image area, the auxiliary information H1 is 0 and the auxiliary information H2 is 0, the first color conversion table T1 is used. When the auxiliary information H1 is 1 and the auxiliary information H2 is 0, the second color conversion table T2 is used. When the auxiliary information H1 is 0 and the auxiliary information H2 is 1, the third color conversion table T3 is used. When the auxiliary information H1 is 1 and the auxiliary information H2 is 1, the fourth color conversion table T4 is used. With this, the image data S0 is converted to the image data S1, whereby the auxiliary information H1 and the auxiliary information H2 can be embedded into the image data S0. Notice that the first through the fourth color conversion tables T1, T2, T3, T4 are switched according to the contents of the auxiliary information H1 and auxiliary information H2 input to the table modulation means 21.

Note that while, in this example, two pieces of information H1, H2 have been embedded using the first through the fourth color conversion tables T1 to T4, it is also possible to embed the information H1 and the information H2 by using two tables. This means, for example, to embed the information H1 and information H2 into different color coordinates by using the first and fourth color conversion tables T1, T4. And in performing color conversion for each pixel within each image area, it is decided whether the color coordinate is color coordinate I or I' or the other color coordinate. If it is the color coordinate I, the content of the auxiliary information H1 in the area is decided. If it is 1, the fourth color conversion table T4 is used for the pixel. If it is 0, the first color conversion table is used. On the other hand, if the color coordinate is color coordinate I', the content of the auxiliary information H2 is decided instead of the auxiliary information H1. If it is 1, the fourth color conversion table T4 is used for the pixel, and if it is 0, the first color conversion table is used. Note that when the color coordinate is neither color coordinate I or color coordinate I', either of the first and fourth color conversion tables T1, T4 may be used, but if the table used in the immediately prior conversion is used as it is, this will be desirable from the standpoint of a speed of calculation. And by switching the first and fourth color conversion tables T1, T4 in accordance with a color coordinate in this manner, a plurality of pieces of information can be embedded into different color coordinates.

Note that in order to detect the embedded auxiliary information H1 and auxiliary information H2, whether or not the color coordinates J, J+1 are present is detected for each of the image areas corresponding to the above-mentioned 6 image areas of the image represented by the image data S1, whereby the auxiliary information H1 can be calculated the same as the above-mentioned second example. Also, if it is detected whether or not the color coordinates J', J'+1 are present, the auxiliary information H2 can be calculated.

Note that although, in the above-mentioned third example, two pieces of information H1, H2 have been embedded into the image data S0, a plurality of color areas, where the number of quantizations increases like the color areas B and C shown in FIG. 10 in performing color conversion from the first color space to the second color space, are also present elsewhere. Therefore, by generating a color conversion table, which makes the conversion destination of a color coordinate in the first color space different from the first color conversion table T1, for each of such color areas, a greater number of pieces of auxiliary information can be embedded into the image data S0 selectively.

Figure 15:
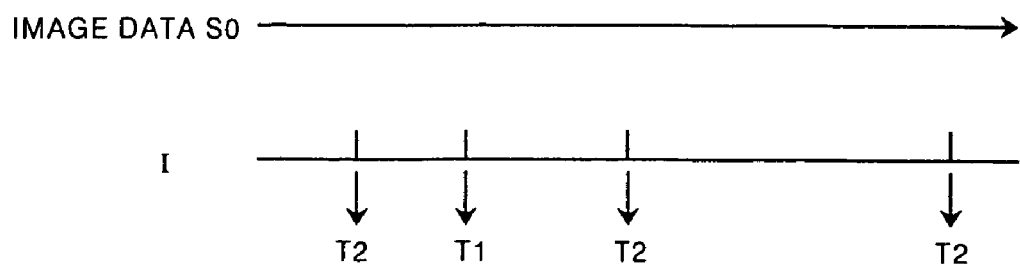
FIG. 15 is a diagram for describing an information embedding state in a fourth example of the information embedding method that utilizes color coordinates.

In addition, although, in the above-mentioned second and third examples, auxiliary information has been embedded by dividing an image represented by the image data S0 into a plurality of image areas and switching a color conversion table to be used for each of the image areas, it is also possible to embed the auxiliary information at the pixel positions of the image represented by the image data S0. This will hereinafter be described as a fourth example. FIG. 15 is a diagram for describing the process that is performed in the fourth example. In the fourth example, the image data S0 is scanned in a raster fashion to perform color conversion for each pixel, and in the middle of the color conversion by this raster scan, the first and second color conversion tables T1, T2 are switched the same as the second example, each time the color coordinate I in the first color space appears. In this way, auxiliary information H1 is embedded. Note that it is assumed that in this example, auxiliary information H1 of "1011" is embedded.

First, the image data S0 is scanned in a raster fashion from its initial pixel position (e.g., the coordinate value of a pixel, (0, 0)). As shown in FIG. 15, until the color coordinate I in the first color space appears, color conversion is performed for the data values of all pixels by the first color conversion table T1, and for the color coordinate I that appears first, color conversion is performed by the second color conversion table T2. Hereinafter, for the color coordinate I that appears second, color conversion is performed by the first color conversion table T1, and for the color coordinates I that appear third and fourth, color conversion is performed by the second color conversion table T2. And after the 4 color coordinates I have appeared, color conversion is performed for all the remaining pixel data values by employing the first color conversion table T1, whereby image data S1 embedded with the auxiliary information H1 is obtained. Note that in this case, there is a need to prescribe the number of information bits to be embedded previously.

Figure 16:
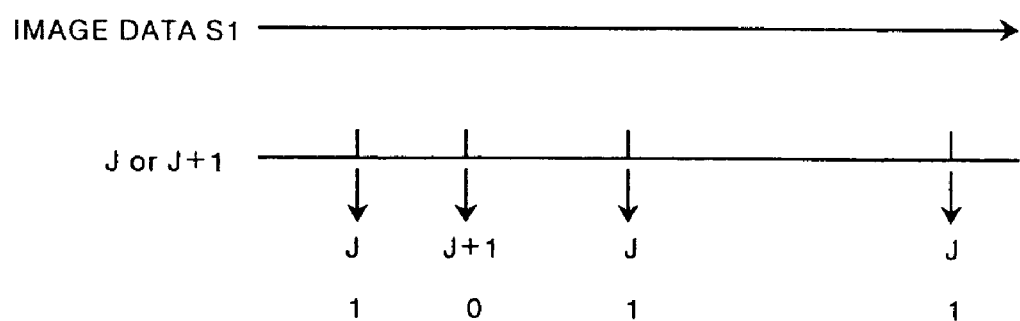
FIG. 16 is a diagram for describing an information reading state in the fourth example of the information embedding method that utilizes color coordinates.

In order to read out the auxiliary information H1 embedded in this way, the image data S1 is scanned in a raster fashion from its initial position, whereby the states of appearance of the color coordinate J and color coordinate J+1 in the second color space are detected at a position corresponding to the color coordinate I in the image data S0. In this case, the color coordinate J and the color coordinate J+1 appear in the order of J, J+1, J, and J, as shown in FIG. 16. Therefore, if the color coordinate J is caused to correspond to 1 and the color coordinate J+1 to 0, the auxiliary information H1 of "1011" can be read out. Note that in this case, a position corresponding to the color coordinate I is necessary on an image represented by the image data S1, so the image data S0 before color conversion becomes necessary for reading out the auxiliary information H1. And by referring to the table that causes the read auxiliary information H1 to correspond to auxiliary information H1 and information H0, the information H0 can be obtained.

Figure 17:
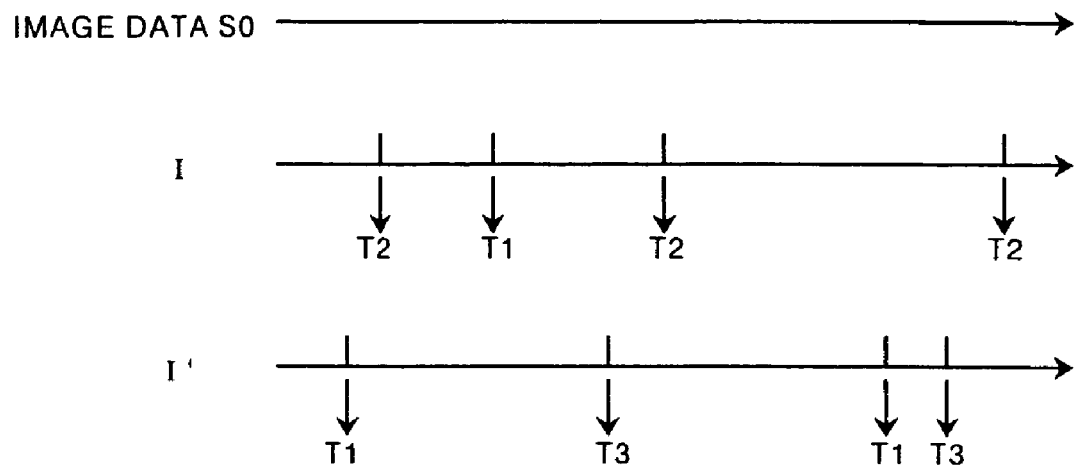
FIG. 17 is a diagram for describing an information embedding state in a fifth example of the information embedding method that utilizes color coordinates.

Note that when auxiliary information H1 is embedded as indicated in the fourth example, it is also possible to simultaneously embed a plurality of pieces of auxiliary information into image data S0. This will hereinafter be described as a fifth example. FIG. 17 is a diagram for describing the process that is performed in the fifth example. Note that it is assumed that in the fifth example, two pieces of auxiliary information H1, H2 are embedded the same as the third example. The fifth example scans image data S0 in a raster fashion in the same manner as the fourth example and, in the middle of this scan, switches the first color conversion table T1 and the second color conversion table T2 in the same manner as the second example each time the color coordinate I in the first color space appears, thereby embedding the auxiliary information H1. Furthermore, the fifth example switches the first color conversion table T1 to the third color conversion table T3 in the above-mentioned third example every time the color coordinate I' in the first color space appears, thereby embedding the auxiliary information H2. Note that it is assumed that in this example, auxiliary information H1 of "1011" and auxiliary information H2 of "0101" are embedded.

First, as shown in FIG. 17, until the color coordinate I in the first color space appears, color conversion is performed for the data values of all pixels by the first color conversion table T1, and for the color coordinate I that appears first, color conversion is performed by the second color conversion table T2. Hereinafter, for the color coordinate I that appears second, color conversion is performed by the first color conversion table T1, and for the color coordinates I that appear third and fourth, color conversion is performed by the second color conversion table T2. On the other hand, for the color coordinate I' that appears first, color conversion is performed by the first color conversion table T1. Hereinafter, for the color coordinate I' that appears second, color conversion is performed by the third color conversion table T3, and for the color coordinates I' that appear third and fourth, color conversion is performed by the first and third color conversion tables T1, T3. And after the 4 color coordinates I and the 4 color coordinates I' have appeared, color conversion is performed for all the remaining pixel data values by employing the first color conversion table T1, whereby image data S1 embedded with the auxiliary information H1, H2 is obtained. Note that in the fifth example, there is also a need to prescribe the number of information bits to be embedded previously, as in the fourth example.

Figure 18:
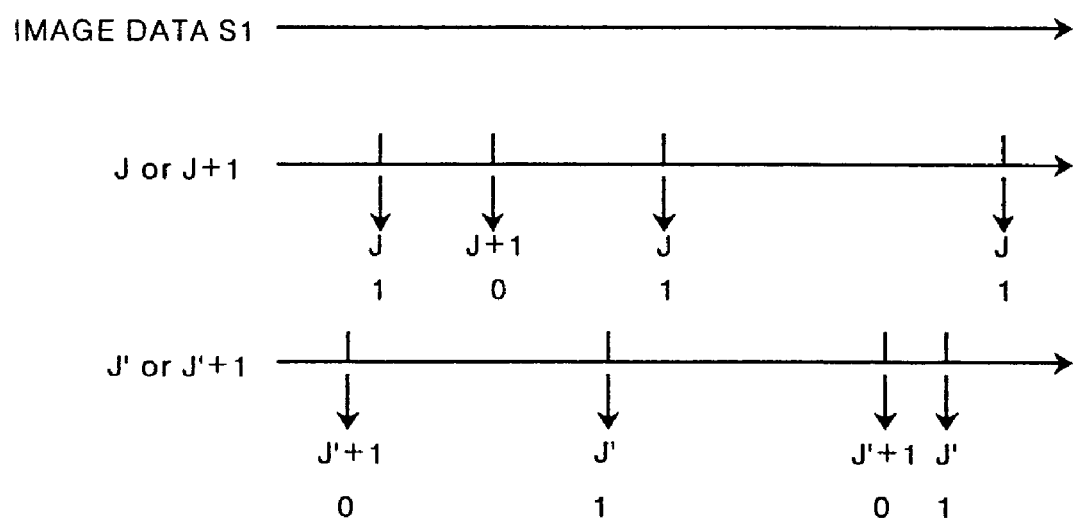
FIG. 18 is a diagram for describing an information reading state in the fifth example of the information embedding method that utilizes color coordinates.

In order to read out the auxiliary information H1 and the auxiliary information H2 embedded in this way, the auxiliary information H1 of "1011" is first read out in the same manner as the above-mentioned fourth example. Thereafter, the image data S1 is scanned in a raster fashion from its initial position, whereby the states of appearance of the color coordinate J' and color coordinate J'+1 in the second color space are detected at a position corresponding to the color coordinate I' in the image data S0. In this case, the color coordinate J' and the color coordinate J'+1 appear in the order of J'+1, J', J'+1, and J', as shown in FIG. 18. Therefore, if the color coordinate J' is caused to correspond to 1 and the color coordinate J'+1 to 0, the auxiliary information H2 of "0101", can be read out. And by referring to the table that causes the read auxiliary information H1 and auxiliary information H2 to correspond to two pieces of auxiliary information H1, H2 and to two pieces of information H0, H0' to be embedded, the information H0, H0' can be obtained.

Thus, in the fifth example, it is possible to embed a plurality of different pieces of information H1, H2 into a single image data S0. Also, while different auxiliary information can be embedded for each color coordinate, the auxiliary information cannot be read out if the color coordinate used in embedding the auxiliary information is not known. For this reason, different readable auxiliary information can be read out according to whether or not there is information about a color coordinate used in embedding auxiliary information. Therefore, it becomes possible to restrict accessible auxiliary information for each user, by restricting information about a color coordinate that is made known in accordance with users of image data S1. Furthermore, new auxiliary information can be embedded without deleting auxiliary information that has already been embedded, by employing a new color conversion table that converts a color coordinate differing from embedded auxiliary information.

Figure 19:
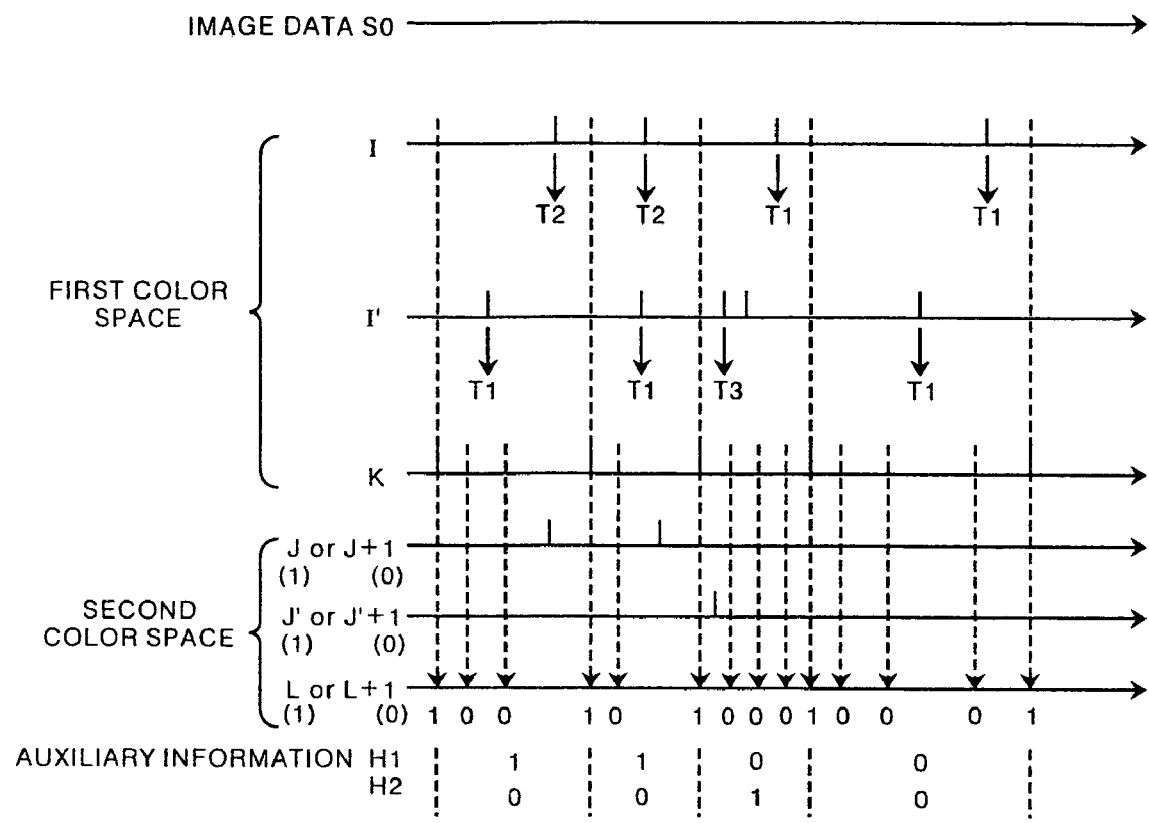
FIG. 19 is a diagram for describing an information embedding state and an information reading state in a sixth example of the information embedding method that utilizes color coordinates.

Note that although, in the above-mentioned fifth example, the image data S0 before color conversion has been employed to specify a position at which information has been embedded, an information embedded position can be specified without using the image data S0 by employing a color coordinate K, whose frequency of appearance is relatively high, as a synchronous signal for specifying an information embedded position, when auxiliary information H1 and auxiliary information H2 are embedded, as shown in FIG. 19. This means that the color coordinate K in the first color space is converted to the color coordinate L+1 in the second color space when no information is embedded and to the color coordinate L in the second color space when information is embedded, and renders it possible to specify an information embedded position without using image data S0 before color conversion, by detecting the state of appearance of the color coordinate L in the second color space after information embedment which corresponds to the color coordinate K in the first color space used as a synchronous signal in reading out embedded information. This will be described as a sixth example of the information embedding method taking advantage of color coordinates.

In performing embedment of information at the time of color conversion of an image, image data S0 is scanned in a raster fashion from its initial position. When color coordinate K appears first, the color coordinate K is converted to the color coordinate L in the second color space by employing a color conversion table that performs embedment of information with respect to the color coordinate K. Thereafter, when color coordinate I and color coordinate I' appear, the data value of a pixel is converted by switching whether the first color conversion table T1 is used and whether the second and third color conversion tables T2, T3 are used, in accordance with the contents of auxiliary information H1 and auxiliary information H2. And in the case where the color coordinates I and I' have both appeared during a period from appearance of the first color coordinate K to appearance of the second color coordinate K, when the second color coordinate K appears, the color coordinate K is converted to the color coordinate L in the second color space by a color conversion table that performs embedment of information. Also, when neither of the color coordinates I, I' appear, the color coordinate K is converted to the color coordinate L+1 in the second color space by a color conversion table that performs no embedment of information. Similarly, for the color coordinates K that appear third and thereafter, whether or not both of the color coordinates I, I' have appeared is judged and the color coordinates K are converted to the color coordinates L, L+1 in the second color space by using the color conversion table that performs embedment of information when both have already appeared and the color conversion table that performs no embedment of information when neither has appeared.

When image data S1 after color conversion is scanned in a raster fashion from its initial position, by performing color conversion in this manner, the color coordinate I and color coordinate I' in the image data S0 before color conversion appear at least once during an interval from the appearance of color coordinate L to the appearance of the next color coordinate L. Therefore, this interval between the color coordinate L and the color coordinate L is used as an interval that 1-bit information is embedded, and when the color coordinate I and the color coordinate I' appear, the data value of a pixel is converted by switching color conversion tables. And in the case where the color coordinate I and color coordinate I' appear in the appearance interval of the color coordinate L in the second color space until the fifth color coordinate L appears in the image data S1 after color conversion, when a synchronous signal such as the aforementioned is embedded, auxiliary information H1 of "1100" and auxiliary information H2 of "0010", can be embedded as shown in FIG. 19 by switching color conversion tables.

Note that although, in the sixth example, there are cases where a plurality of color coordinates I and color coordinates I' appear in the appearance interval of the color coordinate L in the second color space, information can be embedded without confusion by previously setting a rule that information is embedded only for the color coordinates I, I' that appear first. Also, there are cases where the color coordinates I, I' do not appear at all in the appearance interval of the color coordinate K. In this case, until the color coordinate I and color coordinate I' appear, color coordinate K is not used as a synchronous signal, even if the color coordinate K is detected. Therefore, information can be embedded without confusion.

Note that although, in the above-mentioned fourth through the sixth examples, the position of starting raster scan of image data S0, S1 employs, for example, the position at which the coordinate of a pixel is (0, 0), the present invention is not to be limited to this, but raster scan may be started from an arbitrary pixel position.

Figure 20:
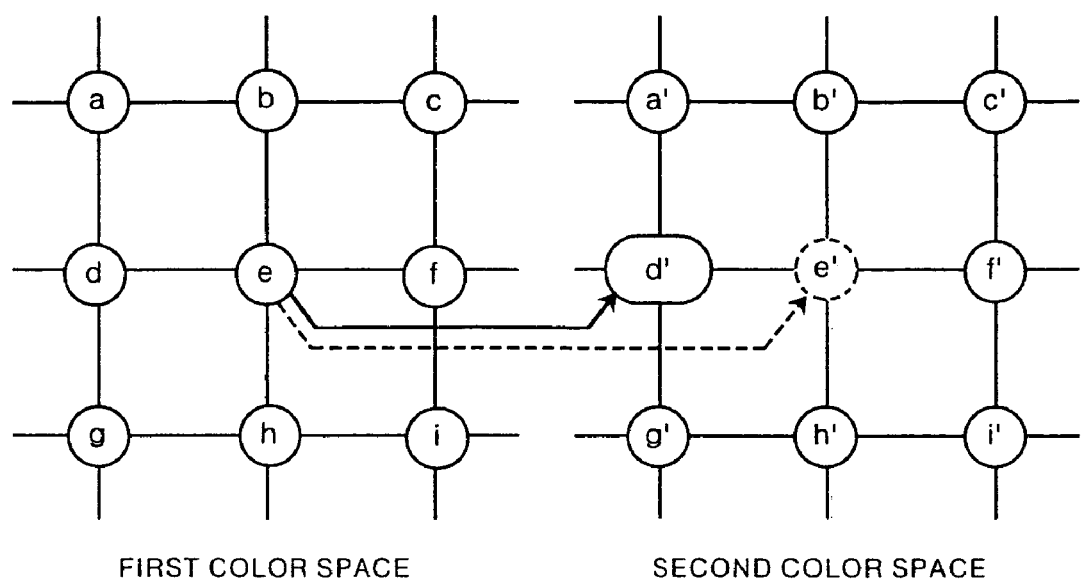
FIG. 20 is a diagram for describing a method of coping with the case that color coordinates in a conversion destination cannot be ensured.

Note that although, in the above-mentioned second through the sixth examples, auxiliary information is embedded into a space, where the number of quantizations increases, for example, by employing a color not used in the second color space, there are cases where sufficient color coordinates in a destination of conversion cannot be ensured to embed auxiliary information, depending upon properties of the first and second color spaces. In this case, color coordinates in a destination of conversion are ensured in the following manner. FIG. 20 is a diagram for describing a method of coping with the case where color coordinates in a destination of conversion cannot be ensured. First, in the second color space, color coordinate e' into which information is embedded is predetermined, and color coordinate e in the first color space, which is converted to this color coordinate e' at the time of color conversion, is calculated. And, two color conversion tables, a color conversion table which converts the color coordinate e in this first color space to the color coordinate e' in the second color space as shown by a broken line in FIG. 20 and a color conversion table which converts the color coordinate e in this first color space to color coordinate d' adjacent to the color coordinate e' in the second color space as shown by a solid line in FIG. 20, are generated. And when color conversion of the image data S0 is performed, auxiliary information can be embedded into image data S0 in accordance with which of these two color conversion tables is used.

That is, 1-bit information can be embedded, by performing color conversion of the image data S0 in the same manner as the above-mentioned second through the sixth examples with the color conversion table, which converts the color coordinate e in the first color space to the color coordinate e' in the second color space, as the first color conversion table T1 and with the color conversion table, which converts the color coordinate e in the first color space to the color coordinate d' adjacent to the color coordinate e' in the second color space, as the second color conversion table T2 and also by whether a position on the image data S1 after conversion that corresponds to the image data S0 before conversion has become the color coordinate d' or the color coordinate e'. Therefore, auxiliary information can be embedded into the image data S0, by switching tables to be used in color conversion in the same manner as the above-mentioned second through the sixth examples.

Figure 21:
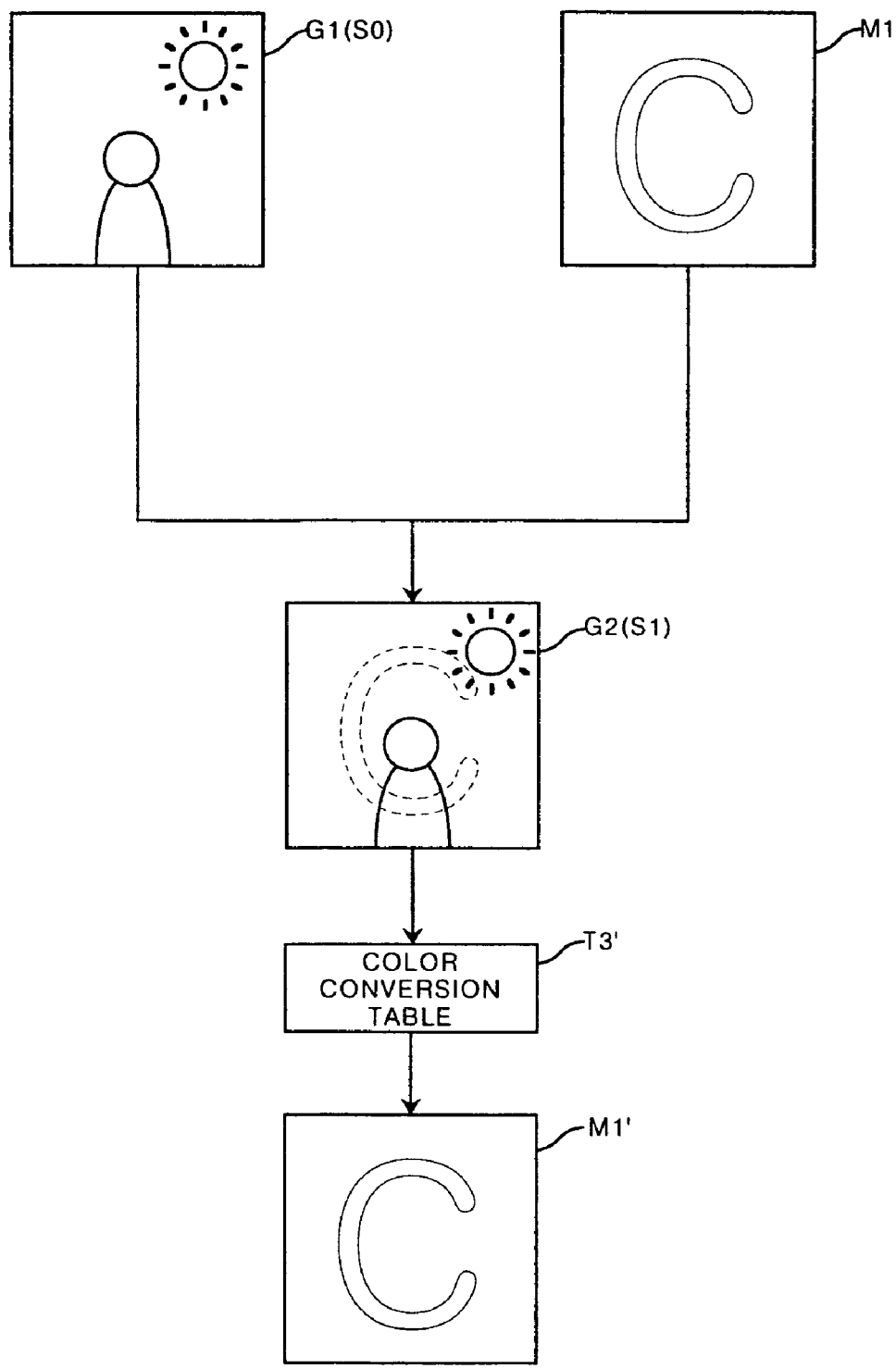
FIG. 21 is a diagram showing the process that is performed in a seventh example of the information embedding method that utilizes color coordinates.

Note that while, in the above-mentioned second through the sixth examples, coded auxiliary information H1 is embedded into the image data S0, it is also possible to embed auxiliary information H1 in pattern form. Embedment of the auxiliary information H1 in pattern form will hereinafter be described as a seventh example of the information embedding method that takes advantage of color coordinates. FIG. 21 is a diagram showing the process that is performed in the seventh example. As shown in FIG. 21, in the seventh example, in converting image G1 represented by image data S0 from the first color space, to which the image G1 belongs, to the second color space, character image M1 with a character pattern of "C" is embedded as auxiliary information H1 in pattern form. Note that the character image M1 has the same number of pixels as the image G1; the character pattern of "C" in the character image M1 has line width sufficiently; and the image data representing this character image M1 is binary data having a value of 1 for its character pattern portion and a value of 0 for its background portion. Also, assume that in the seventh example, a color conversion table that is normally used in converting the image G1 to the second color space is the first color conversion table T1 and a color conversion table that is used to embed the auxiliary information H1 is the second color conversion table T2.

And in converting the image G1 from the first color space to the second color space, auxiliary information H1 is embedded at pixel positions on the image G corresponding to the color coordinates I, I' in the first color space shown in FIG. 10. That is, in converting the image data S0 representing the image G1 from the fist color space to the second color space, the auxiliary information H1 is embedded in pattern form into a color coordinate that is neither present in the second color space nor used when conversion is performed with the first conversion table T1 although present (hereinafter referred to as a hole color coordinate in this example).

Here, if it is assumed that the color data of one color of the three-dimensional RGB image data has a gradation of 8 bits, it can be sufficiently supposed that hole color coordinates of approximately 10 percent appear, when this color data is converted onto a color space differing from the color space that the color data belongs to. Here, if it is assumed that hole color coordinates of 10 percent appear at the time of color conversion, hole color coordinates of 27% ($1-0.9^3$) will appear in the three-dimensional RGB color space by simple calculation. Also, in a case such that image data has a gradation of 16 bits for each color, the probability that hole color coordinates appear becomes higher.

On the other hand, assume that the image G1 has 1000× 1000 pixels, when auxiliary information H1 is embedded in pattern form. If, in such a case, there are about 100×100 pixels that can be embedded, it will be enough to express one character, even if these pixels are present at random on the image. That is, if pixels of one-hundredth of the total pixels of the image G1 become hole color coordinates, the auxiliary information H1 can be embedded in pattern form sufficiently. Here, from the fact that, in the above-mentioned calculation, hole color coordinates of about 27% appear in a single image G1, it becomes possible to reliably embed the auxiliary information H1 in pattern form.

Specifically, each pixel position of the image G1 and each pixel position of the character image M1 are caused to correspond to each other, and for pixel positions at which character patter portions with a value of 1 on the character image M1 overlap each other, color conversion is performed using the second color conversion table T2. As a result, when hole color coordinates are present at the overlapping pixel positions on the image G1, the hole color coordinates are converted by the second color table 2, whereby a color after conversion appears. And for the other pixel positions, color conversion is performed using the first color conversion table T1. With a color after conversion, the auxiliary information H1 is embedded in pattern form into the image G1, whereby image data S1 representing image G2 embedded with the auxiliary information H1 can be obtained as shown in FIG. 21.

Note that in the image G2, the color coordinates at the pixel positions corresponding to the character pattern represented by the auxiliary information H1 has a color difference of about 1 gradation as compared with the case of performing color conversion by the first color conversion table T1, so that the auxiliary information H1 is embedded without being barely recognized visually.

Also, in a natural image, such as a photograph with a gray wall as its background, a photograph with the blue sky as its background and the like, it is usual to draw a widely used color, such as a gray, a blue and the like, such that hole color coordinates are reduced. However, even if colors were apparently the same, hole color coordinates can occur if there is a difference in digital value between colors. Therefore, auxiliary information H1 can be embedded in pattern form. Also, in computer graphics and the like, auxiliary information H1 cannot be embedded in pattern form when, in an image with a background whose digital value is exactly the same, the background does not correspond to hole color coordinates. In such a case, however, auxiliary information H1 can be embedded in pattern form, if hole color coordinates are caused to occur by applying slight noise.

On the other hand, in order to read out the embedded auxiliary information H1, a color conversion table T3', which converts all color coordinates embedded with information in image G2 (e.g., color coordinates J, J' in FIG. 10) to a color entirely differing from them (e.g., color X), is previously prepared. By performing color conversion of the image data S1 representing the image G2 by this color conversion table T3', character image M1' in which the character pattern of the auxiliary information H1 is represented by color X can be obtained. Note that in this example, the character pattern read out from the image G2 is given "'" like the character image M', because the character pattern is not one having values for all the pixels of the character pattern portion like the character image M1, but one having no pixel values at pixel positions other than hole color coordinates.

Figure 22:
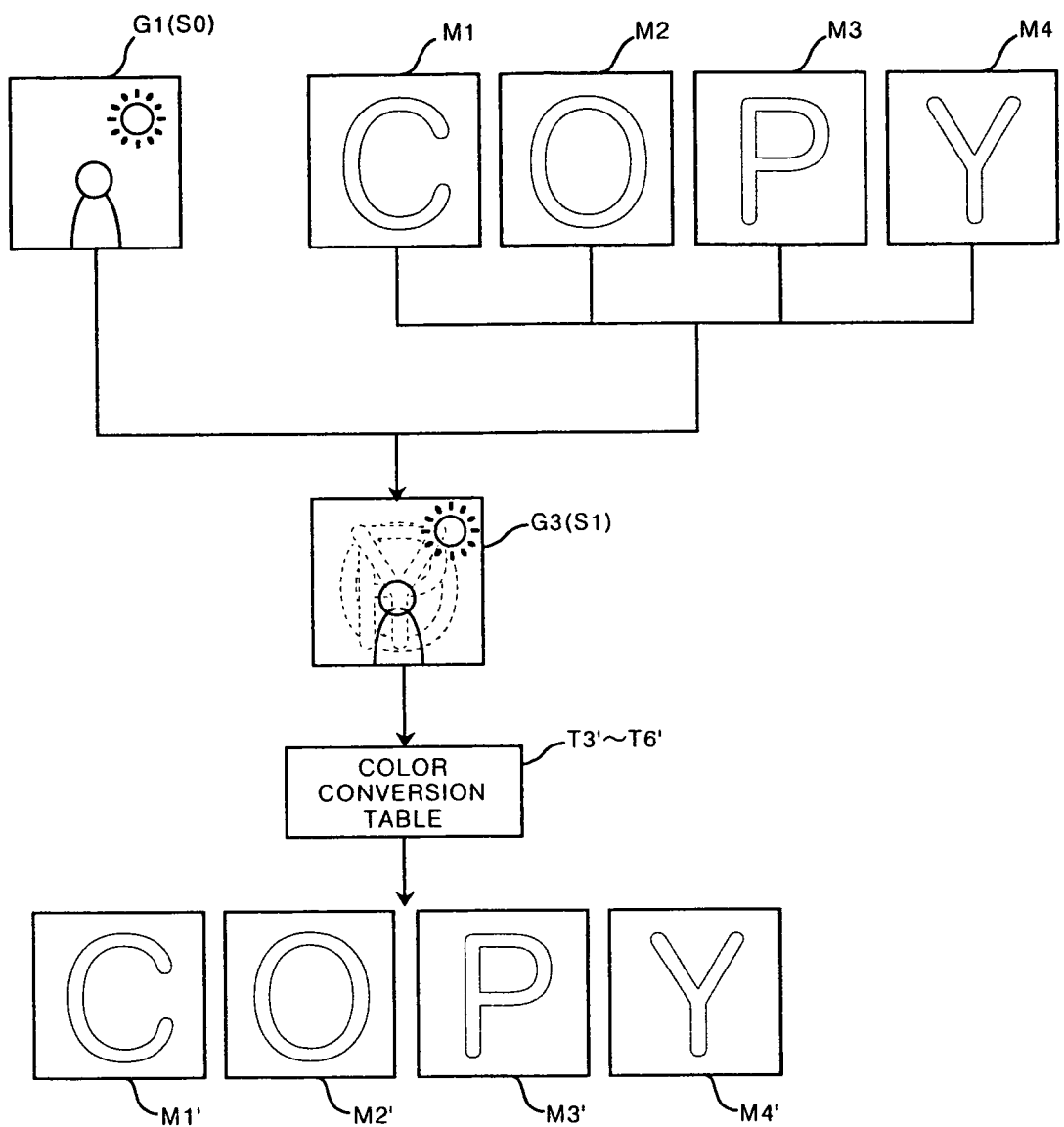
FIG. 22 is a diagram showing the process that is performed in an eighth example of the information embedding method that utilizes color coordinates.

Note that while, in the seventh example, a single character image M1 alone is embedded into the image G1, it is also possible to embed a plurality of character images into the image G1, from the fact that hole color coordinates are present in a single image about 27% of the total pixels, as described supra. This will hereinafter be described as an eighth example of the information embedding method taking advantage of color coordinates. FIG. 22 is a diagram showing the process that is performed in the eighth example. As shown in FIG. 22, in the eighth example, assume that in converting the image G1 represented by the image data S0 from the first color space, to which the image G1 belongs to, to the second color space, character images M1 to M4 with character patterns of "C," "O," "P," and "Y" are embedded as auxiliary information H1 in pattern form.

In this case, the character images M1 to M4 are embedded into mutually different hole color coordinates (which may have one color or a plurality of sets of colors) on the image G1. Therefore, in converting the image G1 from the first color space, to which the image G1 belongs to, to the second color space, the first color conversion table T1 is used for ordinary pixel positions, as in the seventh example, and a plurality of the second color conversion tables T2 are switched and used according to the kinds of the character images M1 to M4 for pixel positions at which auxiliary information H1 is embedded. For instance, in embedding the character image M1 of "C," a color conversion table that converts the color coordinate I (hole color coordinate) in FIG. 10 to the color coordinate J is used and in embedding the character image M2 of "O," a color conversion table that converts the color coordinate I' in FIG. 10 to the color coordinate J' is used. Hereinafter, in embedding the character images M3, M4 of "P" and "Y," a color conversion table, which converts hole color coordinates (e.g., color coordinates I0, I1) differing from color ordinates I, I' to color coordinates (e.g., color coordinates J0, J1) differing from color coordinates (e.g., color coordinates J0+1, J1+1) that are obtained when conversion is performed by the first color conversion table T1, is used. And with this, image G2 embedded as auxiliary information H1 with 4 character images M1 to M4 can be obtained.

On the other hand, in order to read out the embedded auxiliary information H1 consisting of 4 character images M1 to M4, 4 color conversion tables T3' to T6', which convert color coordinates embedded with information in the image G2 (e.g., color coordinates J, J', J0, J1)) to colors entirely differing from them (e.g., colors X0 to X3), respectively, are previously prepared. By sequentially performing color conversion of the image data S1 representing the image G2 by these 4 color conversion tables T3' to T6', character images M1' to M4' in which the character patterns of the character images M1 to M4 are represented by colors X0 to X3 can be obtained in sequence. At this time, by sequentially reproducing the character images M1' to M4', the embedded auxiliary information H can be displayed as a dynamic character string.

Note while, in the above-mentioned seventh and eighth examples, a character image has been embedded as auxiliary information H1, an image, such as an animation, and a figure, etc. can also be embedded as auxiliary information H1 in pattern form. In this case, by embedding a plurality of different patterns and reading out and reproducing the embedded patterns in sequence, as in the eighth example, auxiliary information can be reproduced as a dynamic animation.

Incidentally, in the digital file generation service in a photographic laboratory, the negative film of a user is read by a scanner; image data for printing on which optimum image processing was performed for each image is generated; and this image data is recorded on a recording medium, such as CD-R and the like, and is delivered to the user. At this time, the image data for printing, as it is, is not recorded on a recording medium, but is recorded after conversion onto a color space for a monitor has been performed in such a manner that the image is optimally viewed when reproduced on the CRT monitor of the personal computer of the user. Here, the image data for printing employs a RGB signal that is a recording signal for a digital printer such as a color paper recorder, while the image data for a monitor employs a s-RGB signal, defined as a common color space by the international electrotechnical commission (IEC), or the like.

At this time, color conversion is performed such that the color of an image recorded on color paper coincides under a specific viewing condition with the color of an image displayed on a standard monitor defined by a s-RGB standard. Here, the color paper and the monitor both have 8-bit information for each color of RGB and are capable of expressing $2^{24}$ colors, but an image recorded on the color paper is an image in a color space corresponding to a color reproduced by a printer and an image displayed on the monitor is an image in a color space corresponding to the monitor. Therefore, when the color spaces are caused to coincide with each other, the circumstances that the latter becomes higher in data density in one color area and the former becomes higher in data density in another color area will occur. For this reason, a plurality of combinations of RGB, which are not present in the S-RGB space, are present in the color space of the printer.

For this reason, auxiliary information can be embedded as indicated in each of the above-mentioned examples by a difference between both color spaces. In such digital file generation service, comments at the photographing time, a photographed date, lens information of a camera, information about whether a stroboscope was used, information on a film kind and the like, a photographer's name, an order's name, parameters used in image processing and the like are enumerated as embeddable information.

Figure 23:
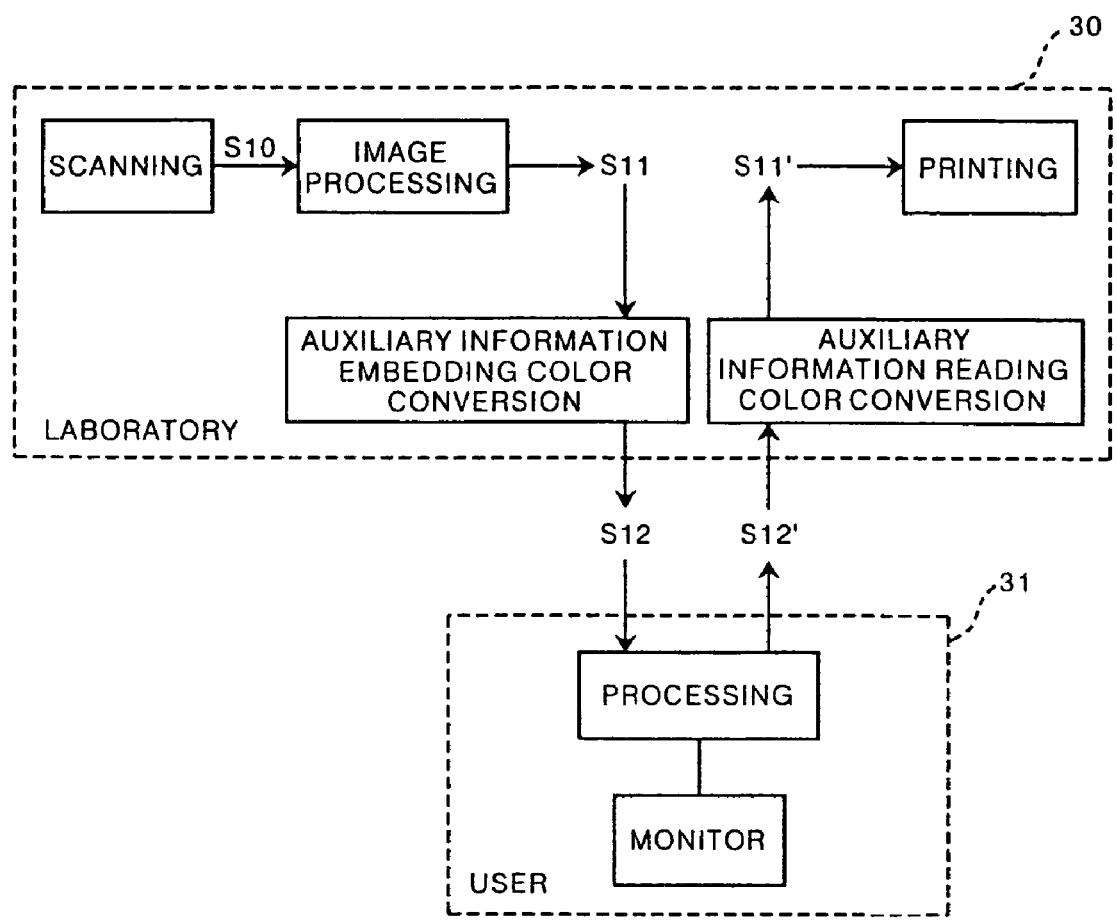
FIG. 23 is a schematic block diagram showing flow of the processing in digital file generation service.

FIG. 23 is a schematic block diagram showing flow of the processing in digital file generation service. First, in a laboratory 30, the negative film of a user 31 is scanned, thereby obtaining digital image data S10. With respect to this digital image data S10, image processing is performed such that an optimum image is reproduced as a print, this being used as image data S11 for printing. And in converting it to image data S12 for a monitor, auxiliary information is embedded. The image data S12 embedded with the auxiliary information is provided for the user 31. At this time, embedment of the auxiliary information is performed by specifying what information is embedded, when the user 31 makes a request to the laboratory 31 for service. Also, the auxiliary information is embedded into the image data S1, as described in each of the above-mentioned examples. The user 31 displays the provided image data S12 on a monitor and further performs processing, such as trimming, character embedment and the like, thereby obtaining processed image data S12'. And in the laboratory 30, the image data S12' is converted onto the color space for printing and the embedded auxiliary information is read out.

Figure 24:
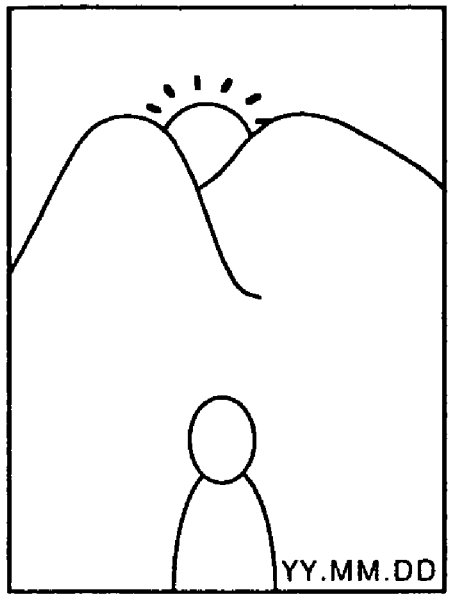
FIGS. 24a, 24b and 24c are diagrams showing an image printed in the digital file generation service.
Figure 24:
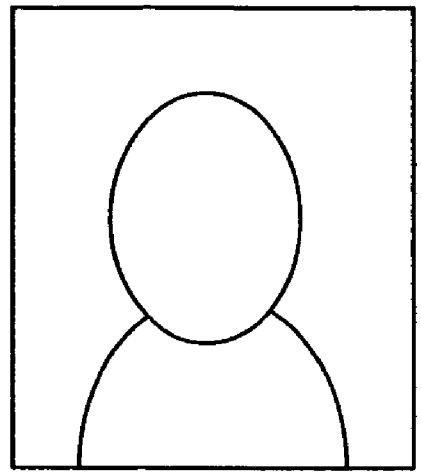
Figure 24:
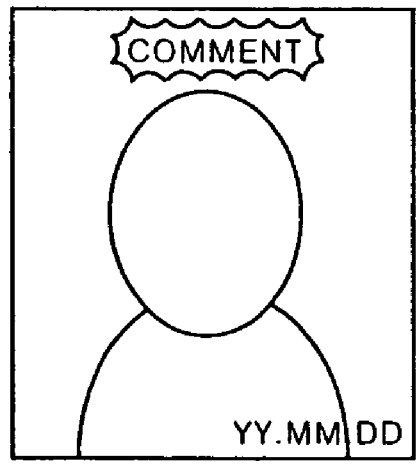
Figure 25:
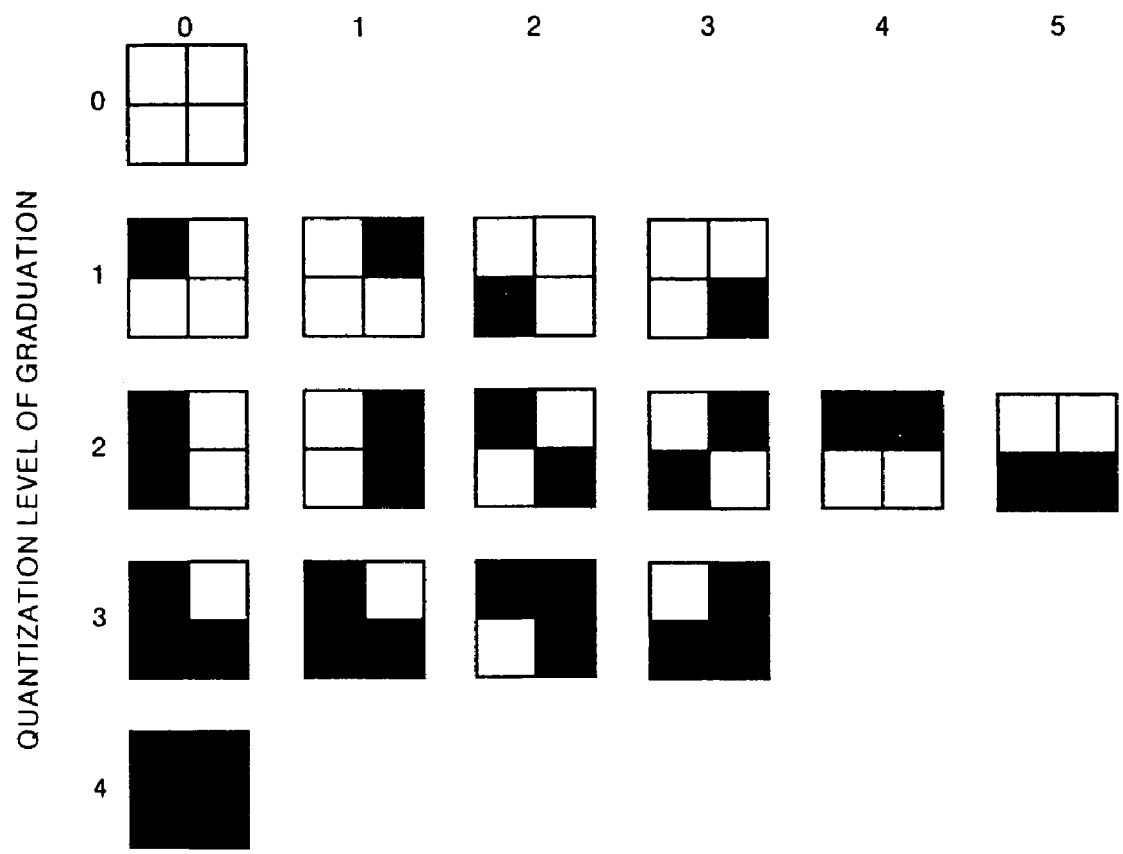
FIG. 25 is a model case of expressing gradation by a change in the area of 4 binary pixels employed as one unit.

At this time, in the laboratory 30 it is possible to read out embedded auxiliary information, as described in each of the above-mentioned examples, by detecting specific color coordinate data. And for example, when embedded auxiliary information is a photographed date and comments at the photographing time, the information can be properly laid out on the processed image and printed. That is, in the case where a request for trimming is made in conventional printing service, when an original image includes a photographed date, as shown in FIG. 24(a), the portion of the photographed date is cut and therefore the image after trimming includes no photographed date. On the other hand, in this example, information about a photographed date is included in the image data S12 as auxiliary information. Therefore, even if trimming were performed as shown in FIG. 24(c), the information about a photographed date can be printed while it is being included in the trimmed image. When comments are included as auxiliary information, they can also be printed simultaneously with the trimmed image.

Note that although a template with various images and photographs laid out thereon is provided for the user 31 so that an image, which the user 31 has, and the template can be combined, there are cases where the template has copyright. In such a case, the copyright information of the creator of a template is embedded as auxiliary information into template data representing the template. With this, it can be confirmed whether or not the template has copyright, by reading out the auxiliary information during printing in the laboratory 30. And when a template has copyright, the laboratory 30 can collect the copyright royalty from the user 31 by adding the copyright royalty to a printing charge.

Also, in the laboratory 30, image processing optimum for printing is performed and then auxiliary information is embedded along with color conversion, whereby the image data S12 is obtained. Therefore, it can be confirmed whether or not image processing optimum for printing has already been performed in a specific laboratory 30, by confirming whether or not auxiliary information has been embedded into the processed image data S12' delivered from the user 31. Therefore, in the case where auxiliary information has been embedded into the image data S12', duplication of the same image processing can be prevented, because it can be confirmed that image processing optimum for printing has already been performed.

What is claimed is:

1. A data delivery method comprising the steps of:
   specifying an embedding position of specific information over a predetermined range in data to be delivered from a server system to a client system;
   embedding said specific information in said data at said embedding position at said server system;
   transmitting said data with said specific information embedded at said embedding position from said server system to said client system; and
   reading out said specific information from said data at said client system by employing information reading means to which said embedding position is made known,
   wherein said embedding position is based on an identification of a receiver receiving said data, and
   wherein said specific information is embedded within said data as an electronic watermark.

2. The data delivery method as set forth in claim 1, wherein said data is delivered via a public line network.

3. The data delivery method as set forth in claim 1, wherein information reading is performed with a printer at said client system and information to specify said printer is output from said printer as said information to specify said receiver.

4. The data delivery method as set forth in claim 1, further comprising:
   after reading out said specific information at said client system, encrypting said specific information and said identification of said receiver and outputting an encrypted output at said client system; and
   returning said encrypted output from said client system to said server system.

5. The data delivery method as set forth in claim 4, wherein said encrypted output is returned to said server system via a public line network.

6. A storage medium having stored software for executing a data delivery method comprising the steps of:
   specifying an embedding position of specific information over a predetermined range in data to be delivered from a server system to a client system;
   embedding said specific information in said data at said embedding position at said server system;
   transmitting said data with said specific information embedded at said embedding position from said server system to said client system; and
   reading out said specific information from said data at said client system by employing information reading means to which said embedding position is made known,
   wherein said embedding position is based on an identification of a receiver receiving said data, and
   wherein said specific information is embedded within said data as an electronic watermark.

7. The storage medium as set forth in claim 6, wherein said data is delivered via a public line network.

8. The storage medium as set forth in claim 6, wherein said step of information reading is performed with a printer at said client system and information to specify said printer is output from said printer as said information to specify said receiver.

9. The storage medium as set forth in claim 6, wherein said method further comprises:
   after reading out said specific information at said client system, encrypting said specific information and said identification of said receiver and outputting an encrypted output at said client system; and
   returning said encrypted output from said client system to said server system.

10. The storage medium as set forth in claim 9, wherein said step of returning said encrypted output utilizes a public line network to return said encrypted output.

11. The storage medium as set forth in claim 6, wherein said data is an image data or a voice data.

12. The data delivery method as set forth in claim 1, wherein said data is an image data or a voice data.

13. The data delivery method as set forth in claim 1,
    wherein a plurality of embedding positions are specified in said specifying step,
    wherein said predetermined range is an entirety of a data length such that said specific information is spread across an entirety of said data.

14. The storage medium as set forth in claim 6,
    wherein a plurality of embedding positions are specified in said specifying step,
    wherein said predetermined range is an entirety of the data length such that said specific information is spread across an entirety of said data.

15. A data server, comprising:
    a network interface configured to receive a request for data from a requesting client on a network;
    a data retriever configured to retrieve said data requested by said requesting client;
    an encoder configured to determine an embedding position and configured to embed specific information at said embedding position in said data retrieved by said data retriever; and
    a transmitter configured to transmit said data with said specific information embedded at said embedding position to said requesting client,
    wherein said embedding position is based on an identification of a requesting user of said requesting client, and
    wherein said specific information is embedded within said data as an electronic watermark.

16. The data server of claim 15, further comprising a decrypter
    configured to decrypt an encrypted message from said requesting client, wherein said encrypted message includes an embedding position information of said specific information in said data received by said requesting client and includes an identification information of said requesting user, and
    configured to verify said embedding position information encrypted in said encrypted message with said embedding position determined by said encoder and to verify said identification information in said encrypted message with said identification of said requesting user.

17. A data requesting client, comprising:
    a data requester configured to request data from a server over a network;
    a data receiver configured to receive said data from said server over said network;
    a position determiner configured to determine an embedding position of specific information embedded in said data; and an encrypter configured to encrypt said embedding position determined by said position determiner and an identification of a requesting user of said data requesting client as an encrypted message and configured to transmit said encrypted message to said server, wherein said embedding position is based on said identification of said requesting user of said data requesting client for said data, and wherein said specific information is embedded within said data as an electronic watermark.

18. The data delivery method as set forth in claim 1, wherein said specific information includes an identification of a provider of said data or an identification of said data server or both.

19. The data delivery method as set forth in claim 1, wherein the step of reading out said specific information includes extracting said specific information from said data.

20. The storage medium as set forth in claim 6, wherein said specific information includes an identification of a provider of said data or an identification of said data server or both.

21. The storage medium as set forth in claim 6, wherein the step of reading out said specific information includes extracting said specific information from said data.

22. The data server of claim 15, wherein said specific information includes an identification of a provider of said data or an identification of said data server or both.

23. The data requesting client of claim 17, wherein said specific information includes an identification of a provider of said data or an identification of said server or both.

24. The data requesting client of claim 17, wherein said data receiver includes a data extractor to extract said specific information from said data.

25. The data delivery method as set forth in claim 1, wherein the identification of the receiver is unique to that receiver.

26. The storage medium as set forth in claim 6, wherein the identification of the receiver is unique to that receiver.

27. The data server of claim 15, wherein the identification of the requesting user is unique to that requesting user.

28. The data requesting client of claim 17, wherein the identification of the requesting user is unique to that requesting user.

* * * * *